(12) United States Patent
Ogasawara et al.

(10) Patent No.: US 11,677,836 B2
(45) Date of Patent: Jun. 13, 2023

(54) SERVER APPARATUS, COMMUNICATION SYSTEM AND COMMUNICATION METHOD

(71) Applicants: Kota Ogasawara, Kanagawa (JP); Tomoko Utsumi, Kanagawa (JP); Emi Machida, Tokyo (JP)

(72) Inventors: Kota Ogasawara, Kanagawa (JP); Tomoko Utsumi, Kanagawa (JP); Emi Machida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/448,939

(22) Filed: Sep. 27, 2021

(65) Prior Publication Data

US 2022/0103639 A1 Mar. 31, 2022

(30) Foreign Application Priority Data

Sep. 30, 2020 (JP) .............................. JP2020-166135

(51) Int. Cl.
*H04L 67/14* (2022.01)
*H04L 9/40* (2022.01)

(52) U.S. Cl.
CPC .............. *H04L 67/14* (2013.01); *H04L 63/08* (2013.01)

(58) Field of Classification Search
CPC ................................. H04L 67/14; H04L 63/08
See application file for complete search history.

(56) References Cited

U.S. PATENT DOCUMENTS

| 2011/0271287 A1* | 11/2011 | Fra | H04W 8/22 718/108 |
|---|---|---|---|
| 2012/0030263 A1* | 2/2012 | John | G06F 16/48 707/825 |
| 2012/0212572 A1* | 8/2012 | Yang | H04N 7/142 348/E7.083 |
| 2014/0082485 A1* | 3/2014 | DeLuca | H04N 7/15 715/243 |
| 2019/0116056 A1 | 4/2019 | Kamekura | |

FOREIGN PATENT DOCUMENTS

JP 2016-033837 3/2016
JP 2017-200080 11/2017

* cited by examiner

*Primary Examiner* — Nicholas P Celani
(74) *Attorney, Agent, or Firm* — IPUSA, PLLC

(57) ABSTRACT

A server apparatus is communicably connected to multiple information processing devices and is configured to manage a session in which content data are transmitted and received between the multiple information processing devices. A communication management unit is configured to manage a connection to the session by each of the information processing devices. An information management unit is configured to receive a request from at least one of the information processing devices and to associate collateral information about an environment with the session. An information transmission unit is configured to transmit the collateral information to the at least one of the information processing devices.

10 Claims, 22 Drawing Sheets

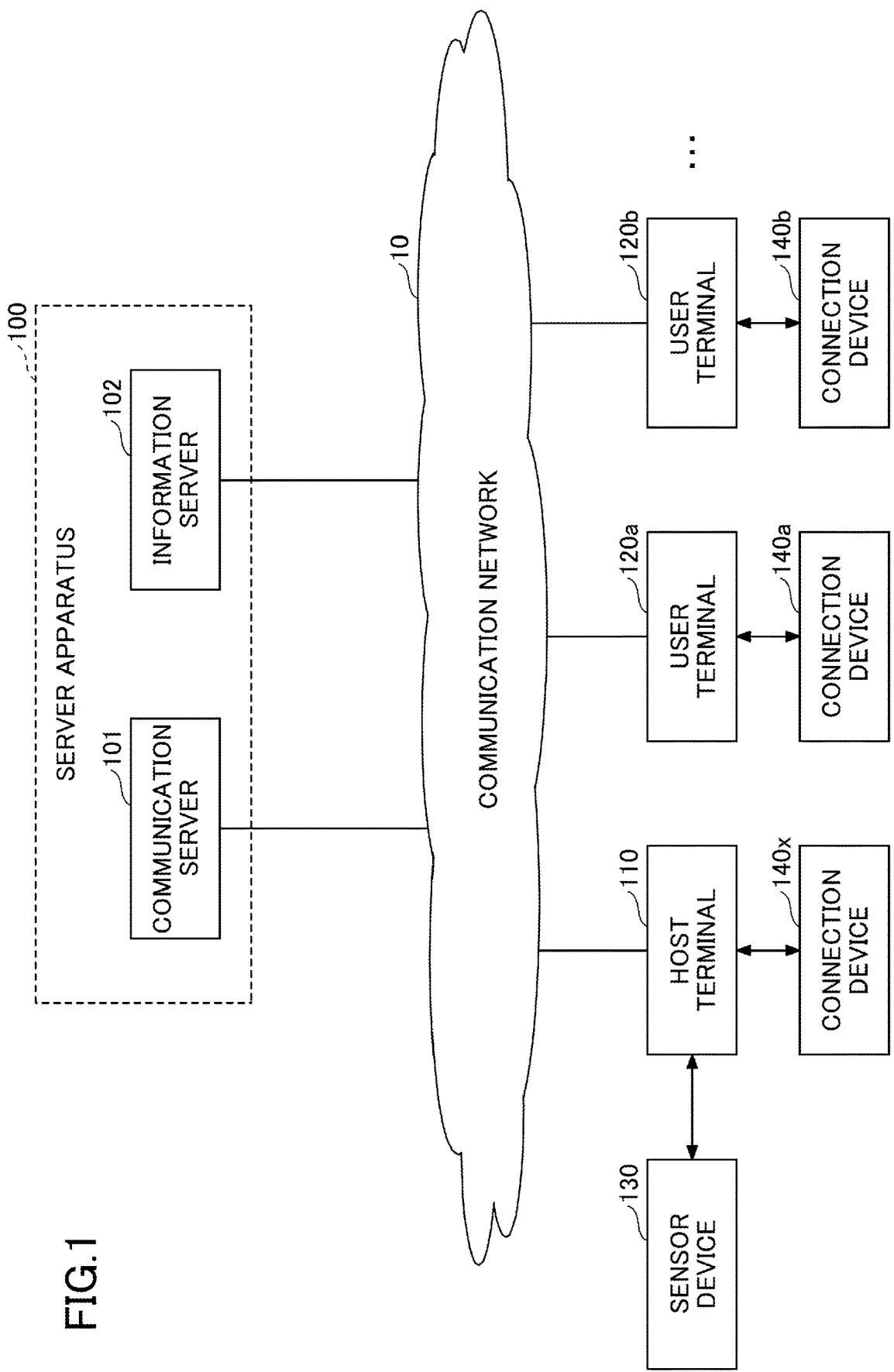

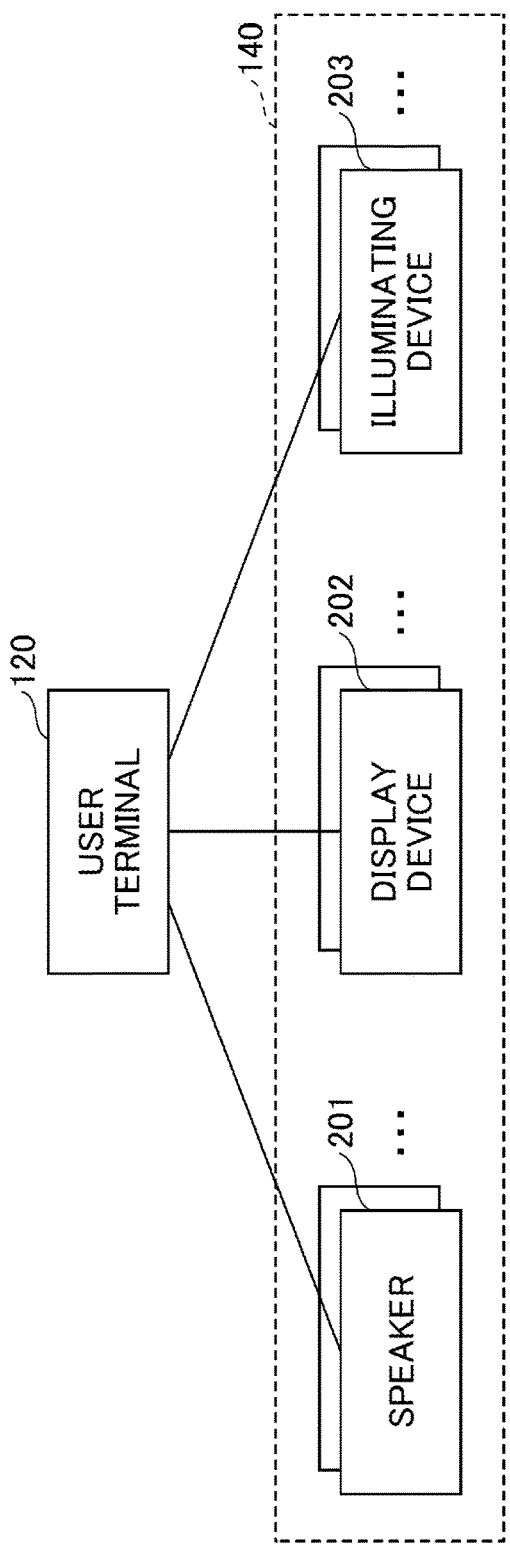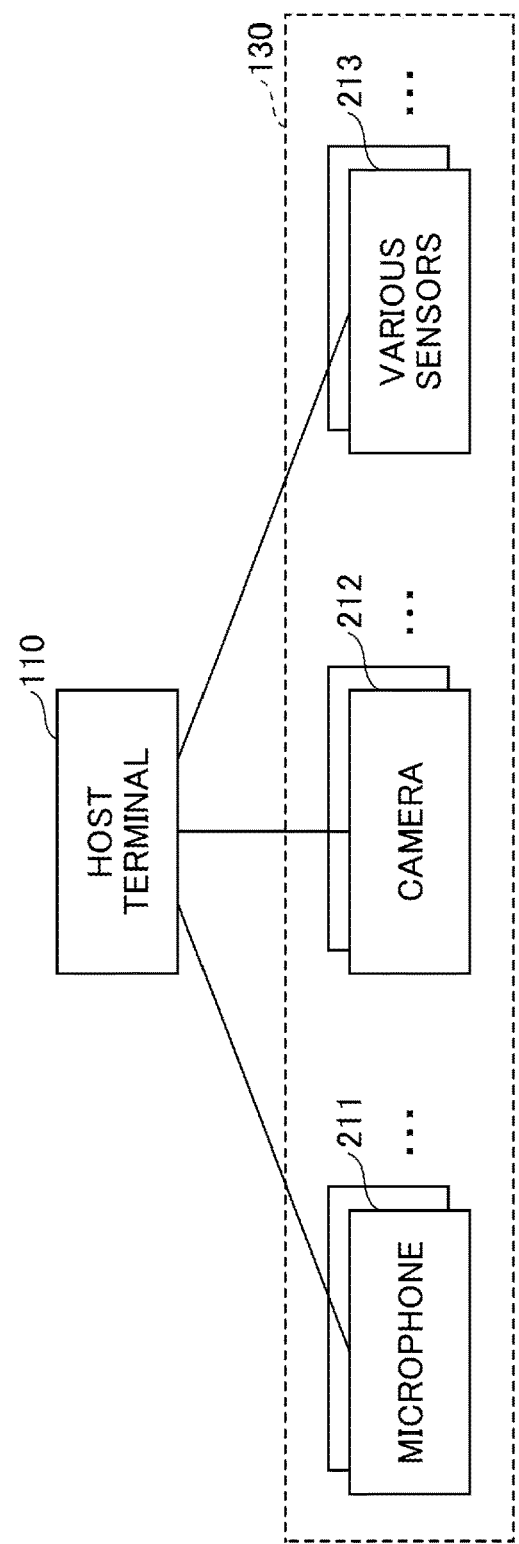

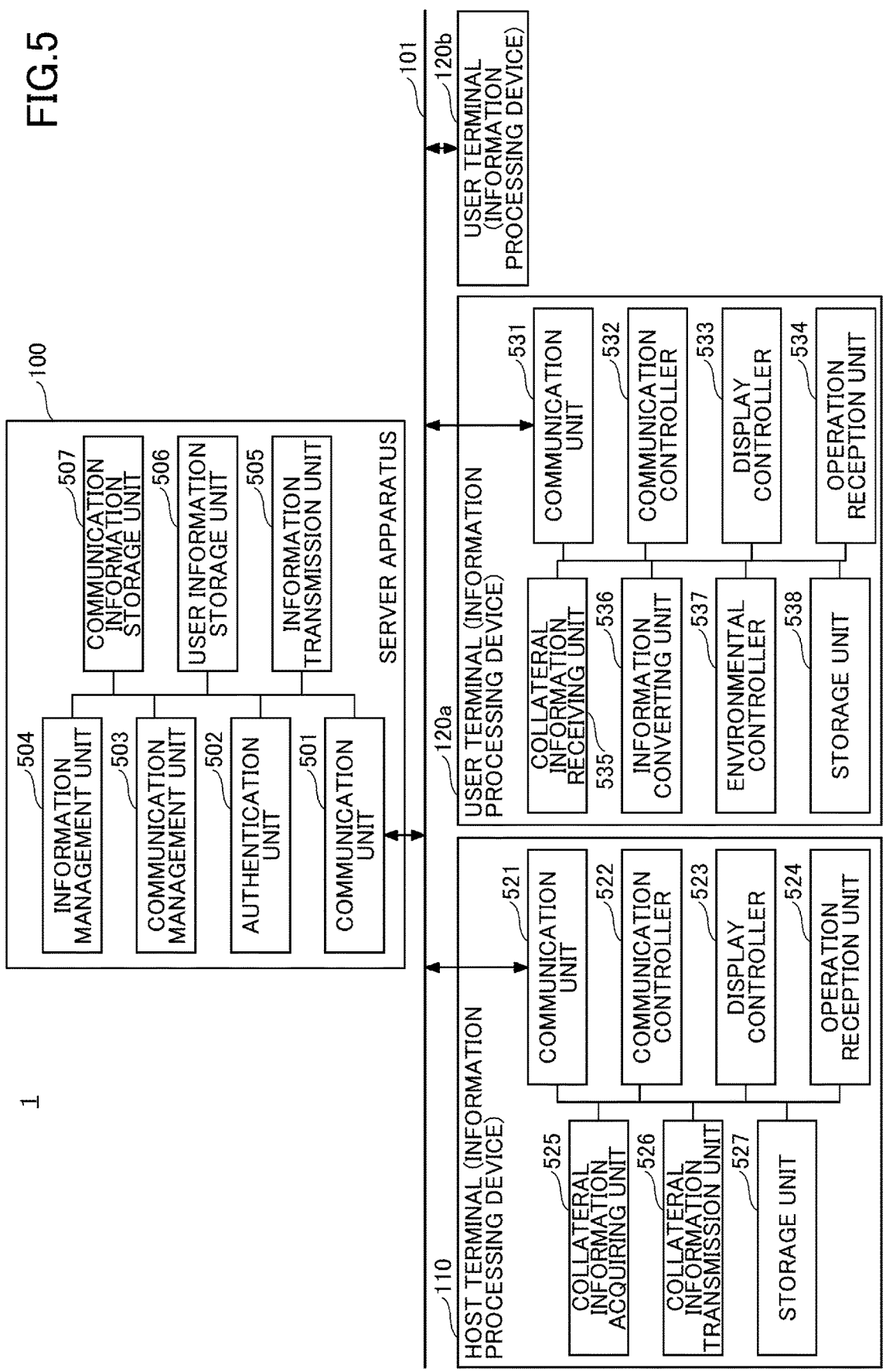

| USER ID | PASSWORD A | USER NAME | UTILIZED COLLATERAL INFORMATION |
|---|---|---|---|
| UID0001 | aaaaa | USER A | SOUND, IMAGE |
| UID0002 | bbbbb | USER B | – |
| UID0003 | ccccc | USER C | SOUND, IMAGE, ILLUMINATION |
| ... | ... | ... | ... |

| SESSION ID | PASSWORD B | COLLATERAL INFORMATION |
|---|---|---|
| SE001 | xxxxx | SOUND, IMAGE, ILLUMINATION |
| SE002 | yyyyy | – |
| ... | ... | ... |

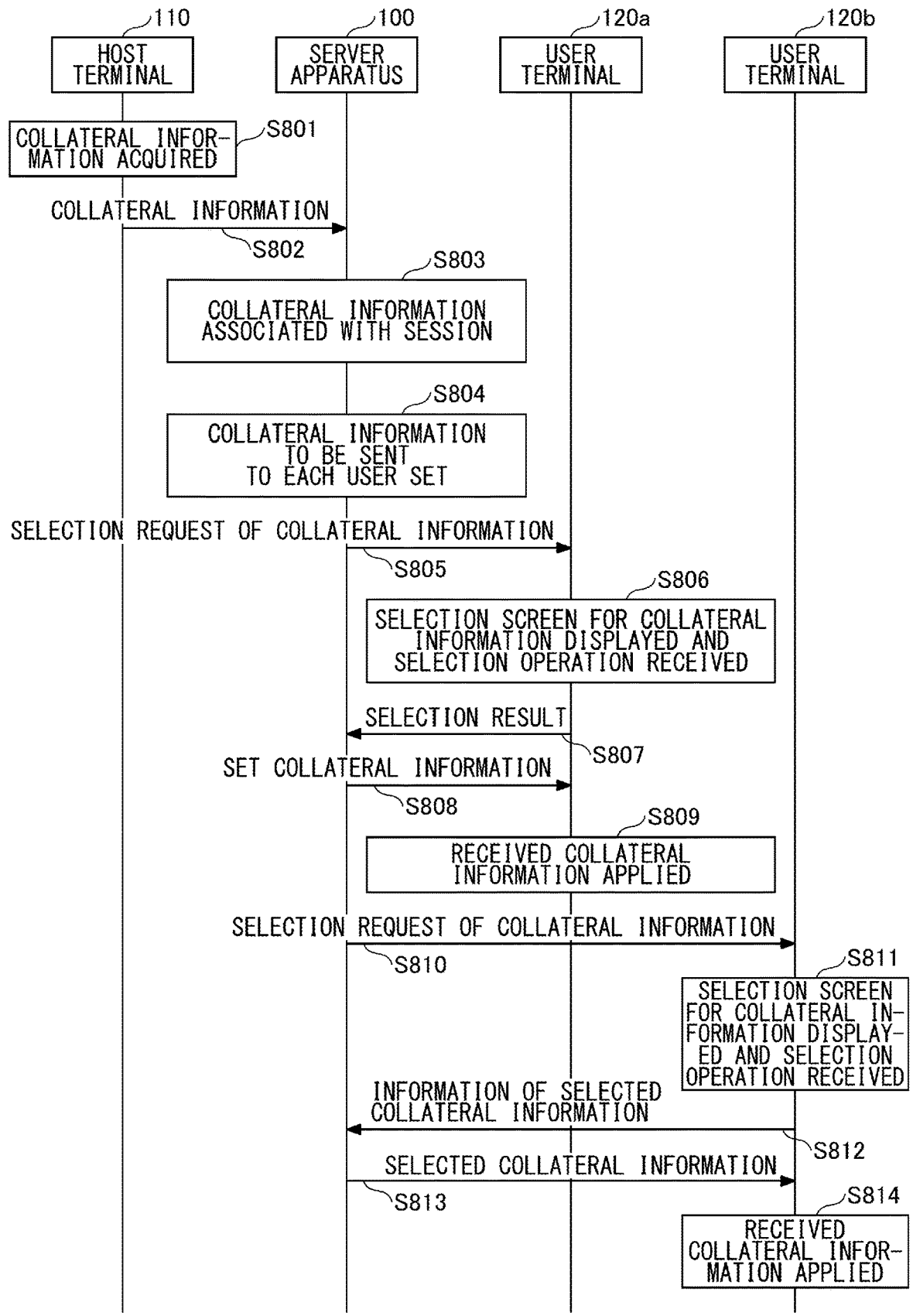

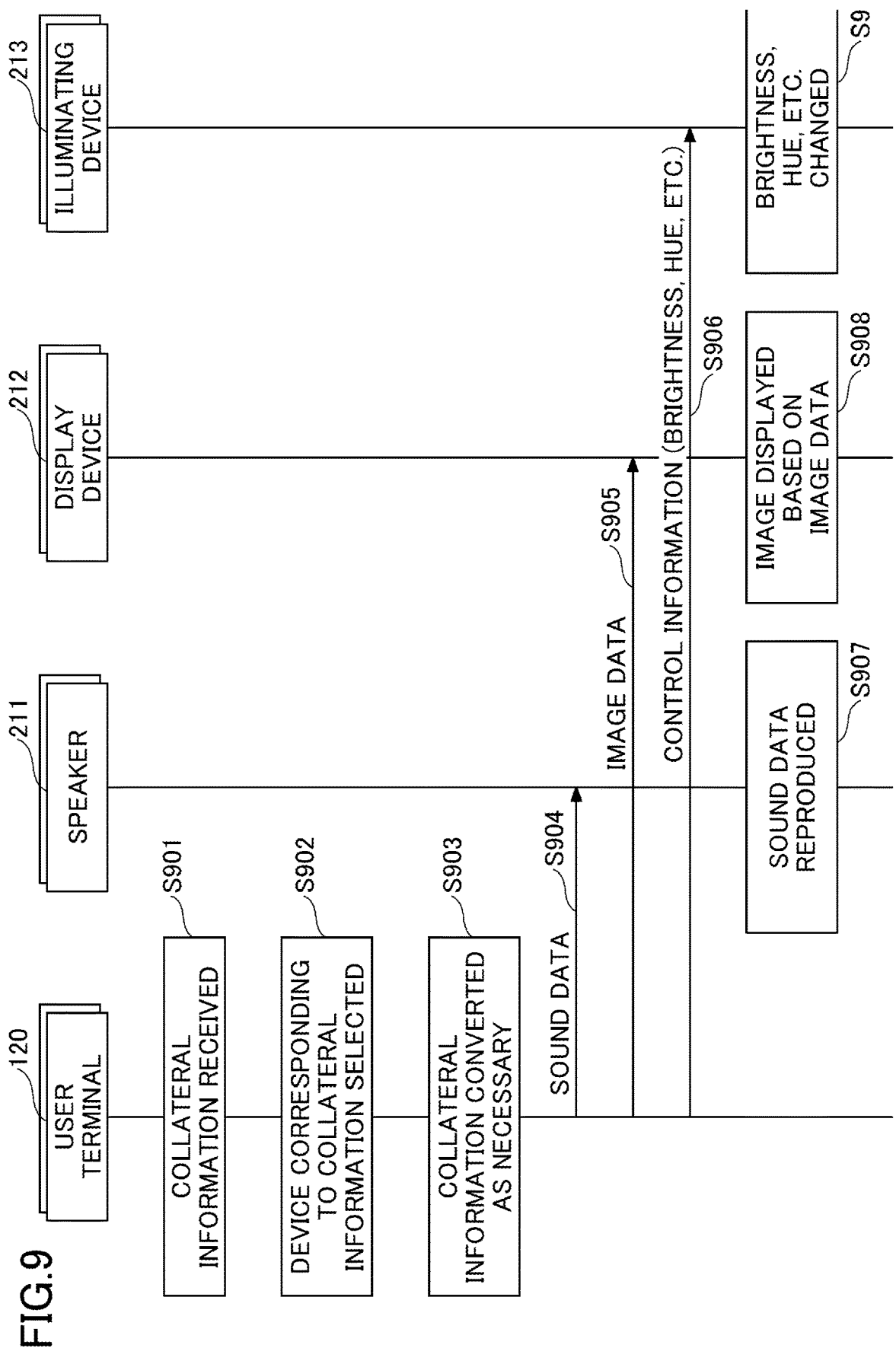

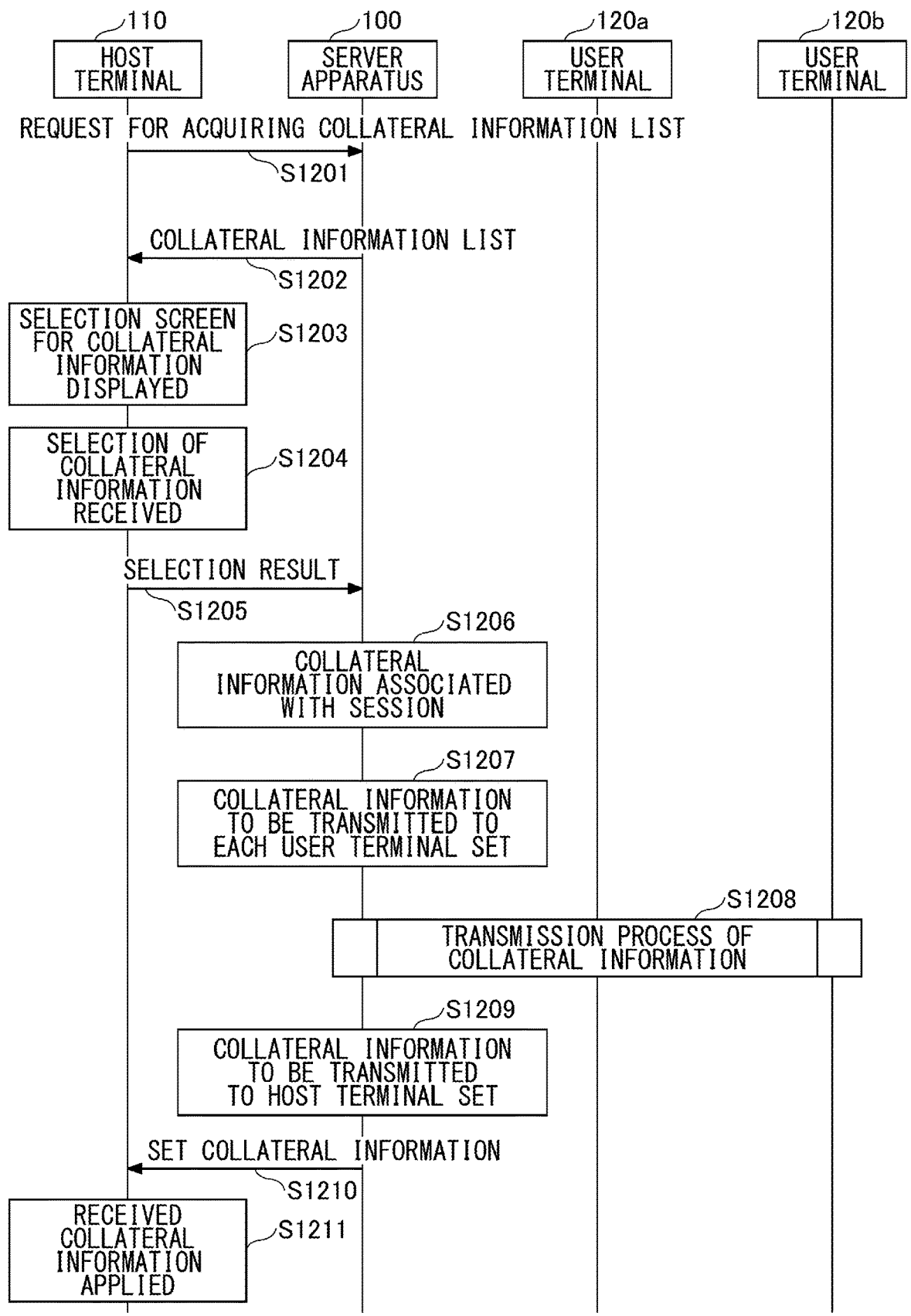

FIG.13A

| SOUND DATA | ILLUMINATION DATA | IMAGE DATA |
|---|---|---|
| WAVE | EVENING | STAR FESTIVAL |
| RAIN | EARLY MORNING | GRAND CANYON |
| WIND | SUNBEAM THROUGH TREES | LAKEFRONT |
| | OFFICE | BUSINESS DISTRICT |
| FIRE OF HEARTH | | TOKYO TOWER |

RAIN (SOUND DATA)
[TAG]
SEASONAL TAG
WEATHER TAG          RAIN
USE TAG
POSITIONAL INFORMATION TAG

TOKYO TOWER (IMAGE DATA)
[TAG]
SEASONAL TAG
WEATHER TAG          RAIN
USE TAG              MEETING
POSITIONAL INFORMATION TAG   LATITUDE ○○○  LONGITUDE ○○○

FIG.14

| TITLE | SOUND DATA | ILLUMINATION DATA | IMAGE DATA |
|---|---|---|---|
| HAWAIIAN SUNSET | WAVE | SUNSET | HAWAIIAN BEACH |
| NEW YORK MORNING | SOUND OF CAR | EARLY MORNING | TIMES SQUARE |
| FOREST | BIRD-SONG | SUNBEAM THROUGH TREES | WALKING TRAIL IN FOREST |

| SEPARATE SELECTION | SET SELECTION | REGIONAL SET SELECTION |

1515

1510

PLEASE SELECT SOUND DATA FROM FOLLOWING LIST — 1511

- WAVE
- ●RAIN  — 1514
- WIND
- FIRE OF HEARTH
- PRODUCTION SITE
- CAFÉ

PLEASE SELECT ILLUMINATION DATA FROM FOLLOWING LIST — 1512

- EARLY MORNING
- OFFICE
- CLUB
- INDIRECT ILLUMINATION
- RAIN WEATHER

PLEASE SELECT IMAGE DATA FROM FOLLOWING LIST — 1513

- LAKEFRONT
- BUSINESS DISTRICT IN RAIN
- CAFÉ
- ART GALLERY
- SHRINE IN RAIN
- TOKYO TOWER

BACK    ENTER

FIG.15B

| SEPARATE SELECTION | SET SELECTION | REGIONAL SET SELECTION |

PLEASE SELECT DATA SET FROM FOLLOWING LIST

| SET NAME | SOUND DATA | ILLUMINATION DATA | IMAGE DATA |
|---|---|---|---|
| ● HAWAIIAN SUNSET | WAVE | SUNSET | HAWAIIAN BEACH |
| ○ NEW YORK MORNING | SOUND OF CAR | EARLY MORNING | TIMES SQUARE |
| ○ FOREST | BIRD-SONG | SUNBEAM THROUGH TREES | WALKING TRAIL IN FOREST |

ENTER

BACK 1520
1521
1522
1523

FIG.15C

1533 — SEPARATE SELECTION | SET SELECTION | REGIONAL SET SELECTION — 1530

REGION: SHINJUKU-KU, TOKYO
DATE AND TIME: AUGUST 12 9 O'CLOCK } 1532
WEATHER: SUNNY

PLEASE SELECT DATA SET FROM FOLLOWING LIST

| REGION | SOUND DATA | ILLUMINATION DATA | IMAGE DATA |
|---|---|---|---|
| ● SHINJUKU-KU, TOKYO | BUZZ OF CICADA | EARLY MORNING | SHINJUKU GYOEN NATIONAL GARDEN IN SUMMER |
| ○ FUSHIMI-KU, KYOTO | BUZZ OF CICADA | EARLY MORNING | SENBON-TORII |
| ○ LOS ANGELES | RAIN | OFFICE | GRIFFITH OBSERVATORY |
| ○ PARIS | WIND | INDIRECT ILLUMINATION | ARC DE TRIOMPHE |

1531

ENTER

BACK

FIG.17

CURRENT POSITION DATA: SHINJUKU-KU, TOKYO (LATITUDE ○○×  LONGITUDE △△×)
RECEIVING DATE AND TIME: AUGUST 12  9:00
ACQUIRED WEATHER: SUNNY

1701
BUZZ OF CICADA (SOUND DATA)
[TAG]
SEASONAL TAG          SUMMER
WEATHER TAG           SUNNY
USE TAG
POSITION INFORMATION TAG

1702
SHINJUKU GYOEN NATIONAL GARDEN IN SUMMER (IMAGE DATA)
[TAG]
SEASONAL TAG          SUMMER
WEATHER TAG           SUNNY
USE TAG
POSITION INFORMATION TAG          LATITUDE ○○○  LONGITUDE ○○○

1703

| CURRENT POSITION DATA | SOUND DATA | ILLUMINATION DATA | IMAGE DATA |
|---|---|---|---|
| SHINJUKU-KU, TOKYO | BUZZ OF CICADA | EARLY MORNING | SHINJUKU GYOEN NATIONAL GARDEN IN SUMMER |

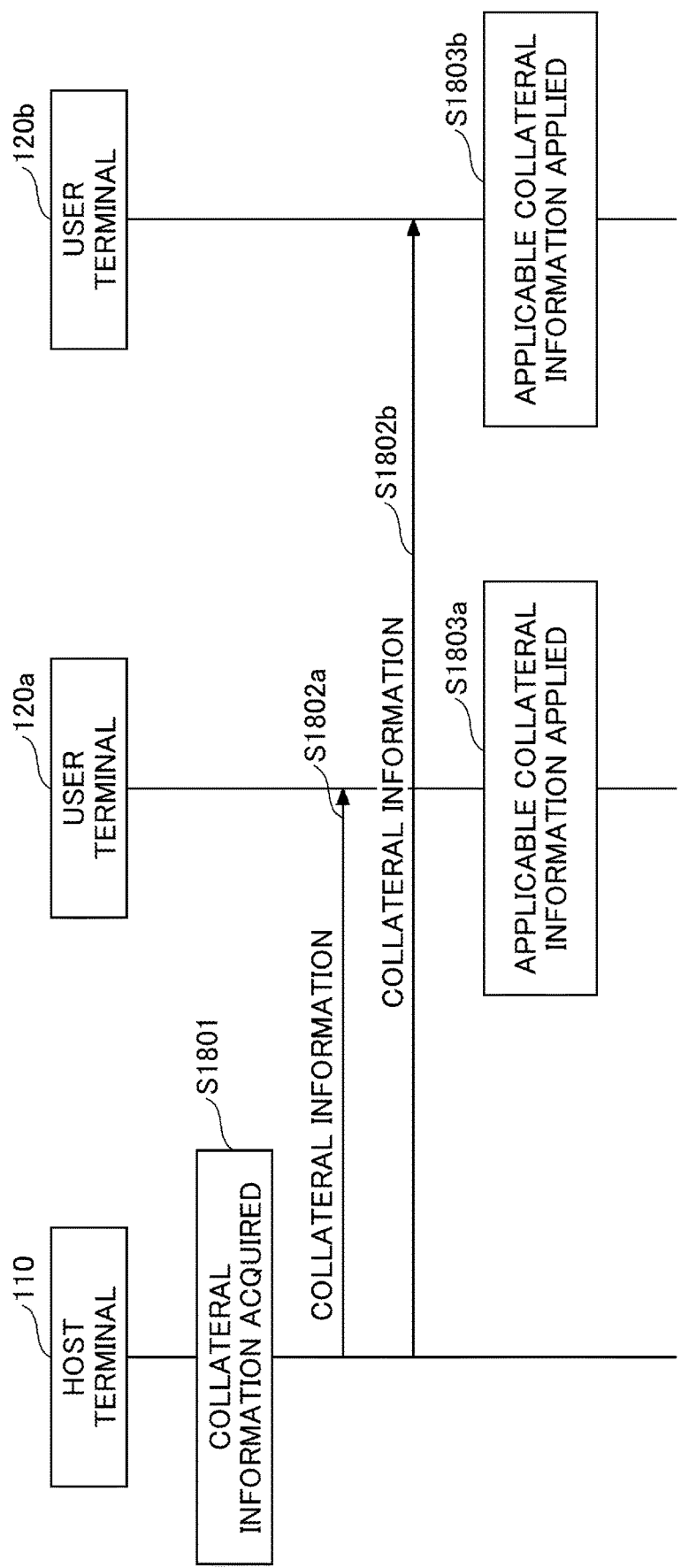

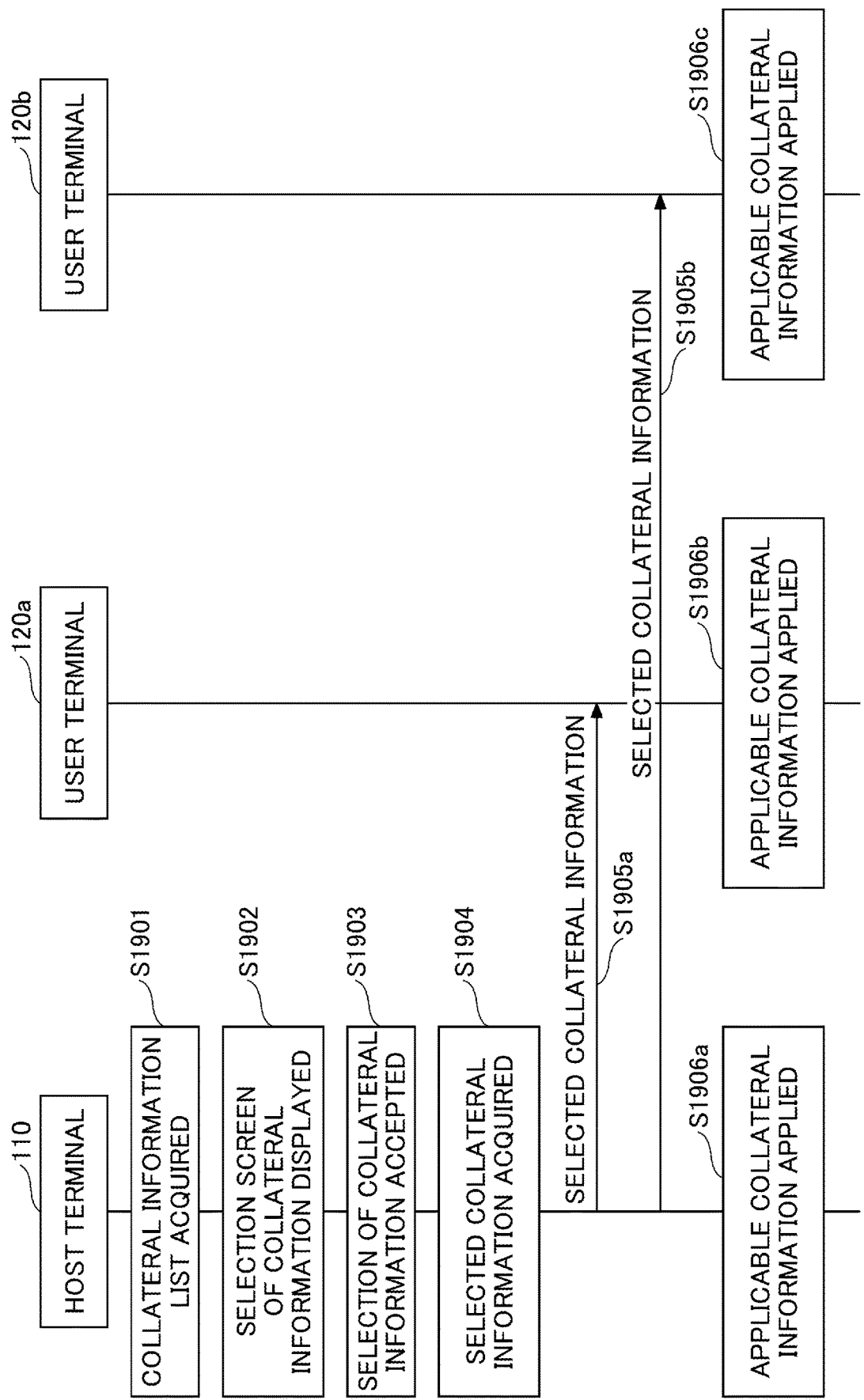

SERVER APPARATUS, COMMUNICATION SYSTEM AND COMMUNICATION METHOD

CROSS-REFERENCE TO RELATED APPLICATION

The present application is based on and claims priority to Japanese Patent Application No. 2020-166135 filed on Sep. 30, 2020, the entire contents of which are hereby incorporated herein by reference.

BACKGROUND OF THE INVENTION

1. Field of the Invention

The present invention relates to a server apparatus, a communication system and a communication method.

2. Description of the Related Art

Online meeting systems that transmit and receive content data such as meeting audios, videos, and application display screens, have become popular among multiple information processing devices.

In addition, there is known an online meeting system that makes it easier to select applications to share when the applications are shared between users, as described in Japanese Unexamined Patent Publication No. 2016-033837.

An online meeting system as described above allows content data to be shared among users participating in an online meeting, for example, an audio, a video, display screens of the meeting and the like.

However, for example, there are problems with conventional online meeting systems in which the environment (for example, a view, a sound, light brightness or hue) cannot be shared between multiple information processing devices participating in an online meeting.

Meanwhile, such problems are not limited to online meetings, but are common to various sessions (for example, online lectures, online clinics, online games, online drinks and the like) where content data are transmitted and received between multiple information processing devices.

SUMMARY OF THE INVENTION

One embodiment of the present disclosure has been performed in view of the above-described problems, and allows for sharing of the environment between multiple information processing devices in a session in which content data is transmitted and received between multiple information processing devices.

More specifically, in order to solve the problem, a server apparatus according to an embodiment of the present invention includes a server apparatus communicably connected to multiple information processing devices and configured to manage a session in which content data are transmitted and received between the multiple information processing devices. A communication management unit is configured to manage a connection to the session by each of the information processing devices. An information management unit is configured to receive a request from at least one of the information processing devices and to associate collateral information about an environment with the session. An information transmission unit is configured to transmit the collateral information to the at least one of the information processing devices.

Other objects, features and advantages of the present invention will become more apparent from the following detailed description when read in conjunction with the accompanying drawings.

BRIEF DESCRIPTION OF THE DRAWINGS

FIG. 1 is a diagram illustrating an example of a system configuration of a communication system according to an embodiment;

FIGS. 2A and 2B are diagrams illustrating an example of a connection device and a sensor device according to an embodiment;

FIG. 5 is a diagram illustrating an example of a functional configuration of a communication system according to a first embodiment;

FIGS. 6A and 6B are diagrams illustrating an image of information managed by a communication system according to a first embodiment;

FIG. 8 is a sequence diagram illustrating an example of a transmission process of collateral information according to a first embodiment;

FIG. 9 is a sequence diagram illustrating an example of an application process of collateral information according to a first embodiment;

FIG. 12 is a sequence diagram illustrating an example of a transmission process of collateral information according to a second embodiment;

FIGS. 13A, 13B and 13C are first diagrams for explaining a list of collateral information according to a second embodiment;

FIG. 14 is a second diagram for explaining a list of collateral information according to a second embodiment;

FIG. 15A is a first diagram illustrating an example of a screen for selecting collateral information according to a second embodiment;

FIG. 15B is a second diagram illustrating an example of a screen for selecting collateral information according to a second embodiment;

FIG. 15C is a third diagram illustrating an example of a screen for selecting collateral information according to a third embodiment;

FIG. 17 is a diagram for explaining an example of a transmission process of collateral information according to a third embodiment;

FIG. 18 is a sequence diagram illustrating an example of a transmission process of collateral information according to a fourth embodiment; and FIG. 19 is a sequence diagram illustrating another example of a transmission process of collateral information according to a fourth embodiment.

DETAILED DESCRIPTION OF THE PREFERRED EMBODIMENTS

Figure 3:
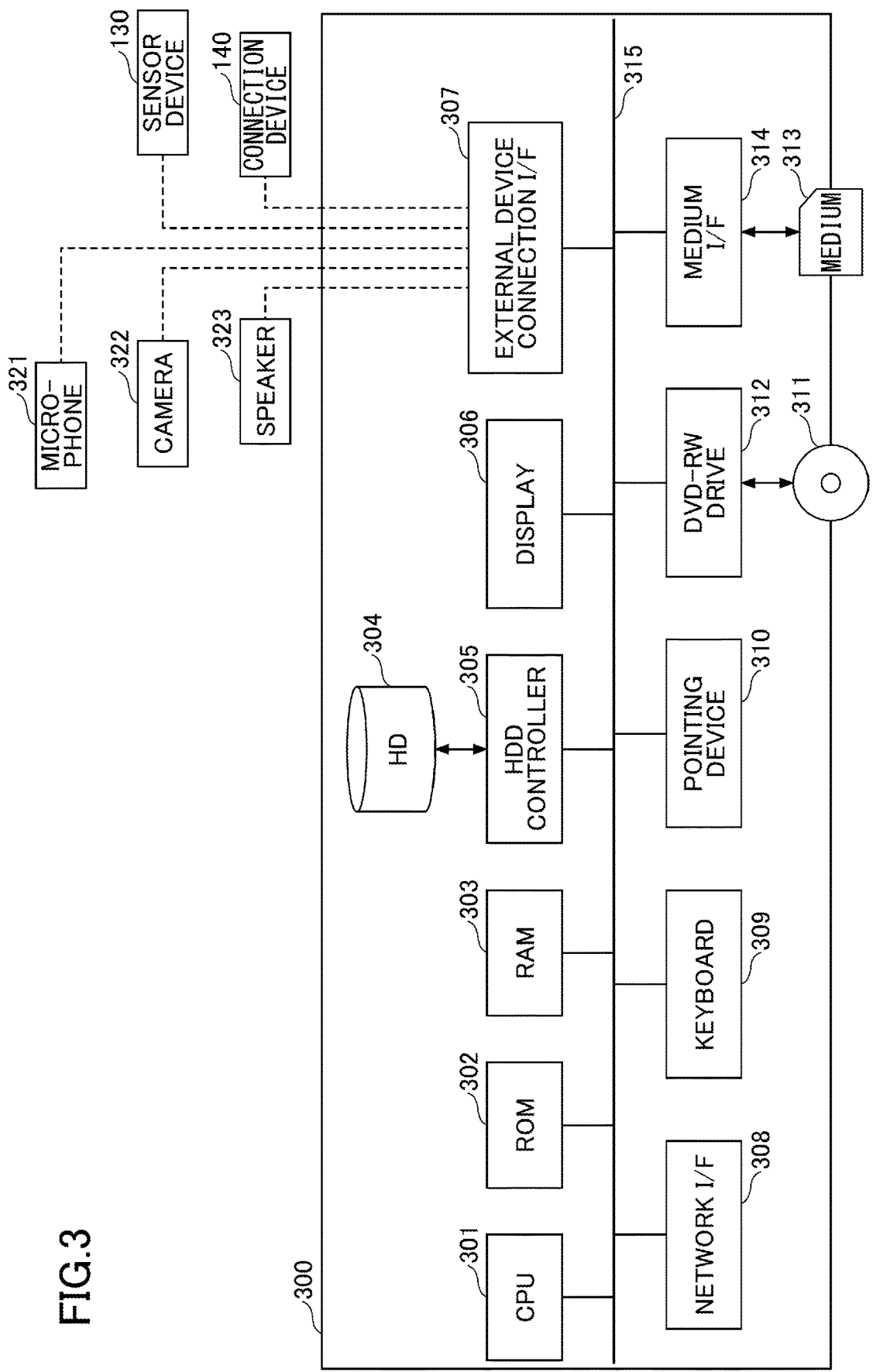
FIG. 3 is a diagram illustrating an example of a hardware configuration of a computer according to an embodiment.

Hereinafter, embodiments of the present invention will be described with reference to the accompanying drawings.

<System Configuration>

FIG. 1 is a diagram illustrating an example of a system configuration of a communication system according to an embodiment. The communication system 1 includes, for example, a communication server 101, an information server 102, a host terminal 110, and one or more user terminals 120a, 120b, . . . , and the like that are communicably connected to each other via a communication network 10. Meanwhile, in the following description, when any user terminal among one or more user terminals 120a, 120b, . . . , is represented, a "user terminal 120" is used. The number of user terminals 120 illustrated in FIG. 1 is an example, and may be another number.

The host terminal 110 and one or more user terminals 120 are information processing devices such as a PC (Personal Computer), a tablet terminal, or a smartphone. For example, the host terminal 110 works by starting an application program (hereinafter, referred to as an "application") for the communication system 1 in a host terminal mode. The user terminal 120 works by starting, for example, an application for the communication system 1 in a user terminal mode.

The communication server 101 is a computer, or a system that includes multiple computers. For example, the communication server 101 manages an online meeting between multiple information processing devices (the host terminal 110 and one or more of the user terminals 120) for transmitting and receiving content data such as a voice, a video, a display screen of an application and the like for a meeting. The online meeting is an example of a session managed by the communication server 101. The session managed by the communication server 101 may be not only an online meeting, but also multiple sessions such as, for example, online lectures, online practice, online games, online drinks and the like. As an example, the following description assumes that the session is an online meeting.

The session is a communication that transmits and receives various content data between two or more information processing devices. The session is connected (or established) at some point and subsequently disconnected (or released). Multiple information processing devices can transmit and receive various content data to and from each other by being connected to the same session.

The information server 102 is a computer, or a system including multiple computers, and stores various types of information used in the communication system 1. The information server 102 may be a web service, a cloud system, or a storage server outside the communication system 1. The communication server 101 and the information server 102 may be one server apparatus 100. In the following description, when it is not necessary to specifically distinguish between the communication server 101 and the information server 102, reference may be simply made to a "server apparatus 100."

Further, the communication system 1 according to the present embodiment has a function of sharing the environment (for example, a view, a sound, brightness of light and/or a hue) in addition to content data such as an audio, a video, and a shared image of a meeting in an online meeting.

For example, one or more user terminals 120a, 120b, . . . have connection devices 140a, 140b, . . . , respectively. Moreover, the host terminal 110 may include a connection device 140x, depending on an embodiment. Meanwhile, in the following description, when any of the connection devices 140a, 140b, . . . , and 140x is indicated, a "connection device 140" is used. The user terminal (information processing device) 120 receives environment-related information (hereinafter, referred to as collateral information) and has a function of controlling an environment around the user terminal 120 by using the connection device 140 based on the received collateral information.

FIG. 2A illustrates an example of a connection device 140 connected to a user terminal 120. In an example of FIG. 2A, the connection device 140 includes one or more speakers 201, a display device 202, and an illuminating device 203.

One or more of the speakers 201 output sounds representing the environment that are different from, for example, the sound of a meeting included in the content data. Here, environment sounds can include various sounds such as, for example, a rain sound, a wind sound, a song of bird, murmur, a vehicle sound, a babble and the like. As a preferred example, the user terminal 120 may output a sound representing the environment from multiple speakers using a high-resolution audio source (High-Resolution Audio) and the like that are higher in quality than the sound of the meeting in order to enhance realistic sensations.

One or more of the display devices 202 display a display image representing the environment that is different from the image of the meeting included in the content data and the like. As a preferred example, the user terminal 120 may display a view and the like on one or more window-shaped display devices or may display a painting and the like on a frame-shaped display device. Further, the user terminal 120 may display an aquarium fish and the like in an aquarium on an aquarium-type display device, or may display the sky and the like on a display device provided at a ceiling.

One or more of the illuminating devices, for example, change the brightness, hue, and the like around the user terminal 120 according to control from the user terminal 120.

In one embodiment, the host terminal 110 is connected to a connection device 140 similar to the user terminal 120. In another embodiment, the host terminal 110 is connected to a sensor device 130 that acquires collateral information regarding the environment around the host terminal 110.

FIG. 2B illustrates an example of a sensor device 130 connected to a host terminal 110. In the example of FIG. 2B, the sensor device 130 includes one or more microphones 211, cameras 212, various sensors, and the like.

One or more of the microphones 211 are used, for example, to obtain sound outputs from one or more speakers 201 connected to the user terminal 120. One or more of the cameras 212, for example, capture a display image (a moving image or a still image) displayed on one or more of the display devices 202 connected to the user terminal 120. Various sensors 213 may include, for example, an illumination sensor for detecting brightness around the host terminal 110, a temperature sensor for detecting a temperature, a humidity sensor for detecting humidity, a noise sensor for detecting volume, a vibration sensor for detecting a vibration, and the like.

By the above-described configuration, for example, in the communication system 1 illustrated in FIG. 1, the host terminal 110 transmits collateral information concerning the environment around the host terminal 110 acquired using the sensor device 130. The user terminal 120 controls the connection device 140 based on the collateral information transmitted by the host terminal 110, and forms the environment around the user terminal 120.

Preferably, the server apparatus 100 manages a session in which content data are transmitted and received between the host terminal 110 and one or more of the user terminals 120, and associates the collateral information transmitted by the host terminal 110 with the session. The server apparatus 100 transmits the collateral information associated with the session to one or more of the user terminals 120 participating in the session. Accordingly, according to the communication system 1 of the present embodiment, in a session in which content data are transmitted and received between multiple information processing devices, an environment around an information processing device (e.g., host terminal 110) can be shared with other information processing devices (e.g., user terminals 120a and 120b).

As another example, the server apparatus 100 may preliminarily store preliminarily acquired collateral information in the information server 102 or an external storage server, and may associate the collateral information specified by the host terminal 110 with a session. In this case, the host terminal 110 reproduces the environment around the host terminal 110 by using the connection device 140x, similar to the user terminal 120, based on the collateral information received from the server apparatus 100.

As described above, according to the present embodiment, in a session in which content data are transmitted and received between multiple information processing devices (e.g., the host terminal 110 and one or more of the user terminals 120), an environment can be shared between the multiple information processing devices.

In conventional online meetings, because only an audio, a video, and a shared screen were sent and received at the meeting, information that influences users' senses, such as a sound, an image, and light that represent the environment, has been deleted. Therefore, in the conventional online meeting, there is a problem, for example, of not being able to obtain a kind of shared sense between the users who participate in the online meeting.

Meanwhile, according to the communication system 1 of the present embodiment, it is possible to provide a material (environment) for obtaining, for example, such a shared sense between multiple users who participate in an online meeting.

The system configuration of the communication system 1 illustrated in FIG. 1 is an example. For example, some or all of the functions of the server apparatus 100 may be provided by the host terminal 110. In this case, the communication system 1 may not include (may include) the server apparatus 100. The host terminal 110 may not be a predetermined information processing device, but may be any information processing device among multiple information processing devices through a setting operation and the like.

<Hardware Configuration>

Figure 4:
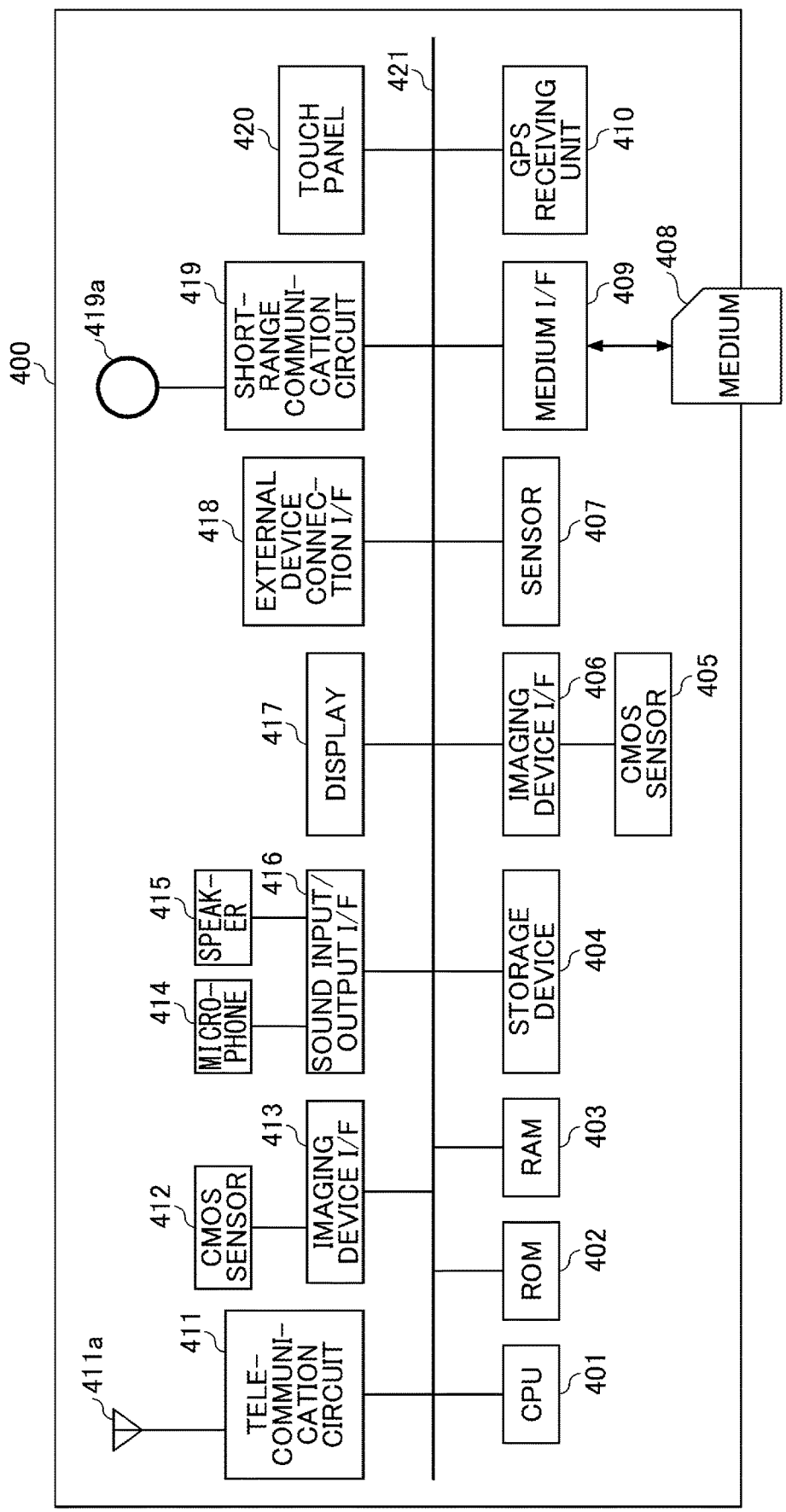
FIG. 4 is a diagram illustrating an example of a hardware configuration of a portable terminal according to an embodiment.

The server apparatus 100 includes a hardware configuration of a computer 300 as illustrated in FIG. 3, for example. Alternatively, the server apparatus 100 may be composed of multiple computers 300. The host terminal 110 and the user terminal 120 have a hardware configuration of the computer 300 as illustrated in FIG. 3 or a hardware configuration of a portable terminal 400 as illustrated in FIG. 4.

(Computer Hardware Configuration)

FIG. 3 is a diagram illustrating an example of a hardware configuration of a computer according to an embodiment. The computer 300 includes, for example, a CPU (CPU) 301, a ROM (Read Only Memory) 302, a RAM (Random Access Memory) 303, a HD (Hard Disk) 304, a HDD (Hard Disk Drive) controller 305, a display 306, an external device connection I/F (Interface) 307, a network I/F 308, a keyboard 309, a pointing device 310, a DVD-RW (Digital Versatile Disk Rewritable) drive 312, a medium I/F 314, and a bus line 315.

Of these, the CPU 301 controls the overall operation of the computer 300. The ROM 302 stores a program used to start the computer 300, such as an IPL (Initial Program Loader). The RAM 303 is used, for example, as a work area of the CPU 301. For example, the HD 304 stores various data such as a program. The HDD controller 305 controls reading or writing of various data to the HD 304 according to the control of the CPU 301.

The display 306 displays a variety of pieces of information such as information about a cursor, a menu, a window, a character, or an image, for example. The external device connection I/F 307 is an interface for connecting various external devices. For example, when the computer 300 is the host terminal 110 or the user terminal 120, the external device connection I/F 307 is connected to a microphone 321 for acquiring an audio of an online meeting, a camera 322 for capturing a video of the online meeting, a speaker 323 for outputting the audio of the online meeting, and the like. The microphone 321, camera 322, speaker 323 and the like may be provided inside the computer 300. Further, when the computer 300 is the host terminal 110 or the user terminal 120, the sensor device 130 or the connection device 140 described in FIG. 2 is connected to the external device connection I/F 307.

The network I/F 308 is an interface for communicating with another computer 300 or the like using the communication network 10. The keyboard 309 is a type of an input unit with multiple keys to receive an input of characters, numbers, various indications, and the like. The pointing device 310 is a type of an input unit for selecting and executing various instructions, selecting a processing target, moving a cursor, and the like.

The DVD-RW drive 312 controls reading or writing of various data to the DVD-RW 311 as an example of a removable recording medium. The DVD-RW 311 may be not only a DVD-RW but also may be another recording medium. The medium I/F 314 controls reading or writing (storing) of data to the medium 313 like a flash memory or a memory card. The bus line 315 includes an address bus, a data bus, and various control signals for electrically connecting the above components.

(Hardware Configuration of Information Terminal)

FIG. 4 is a diagram illustrating an example of a hardware configuration of a portable terminal according to an embodiment. As illustrated in FIG. 3, a portable terminal 400 includes a CPU 401, a ROM 402, a RAM 403, a storage device 404, a CMOS (Complementary Metal Oxide Semiconductor) sensor 405, an imaging device I/F (Interface) 406, a sensor 407, a medium I/F 409, a GPS (Global Positioning System) receiver 410, and the like.

Of these, the CPU 401 controls the operation of the entire portable terminal 400 by executing a predetermined program. The ROM 402 stores a program used to drive the portable terminal 400, for example, an IPL and the like. The RAM 403 is used as a work area of the CPU 401. The storage device 404 is implemented, for example, by an SSD (Solid State Drive), a flash ROM, or the like, and is a high-capacity and non-volatile storage device that stores a program such as an OS (Operating System), an application, and various data.

The CMOS sensor 405 is a type of built-in imaging unit that captures a subject (mainly a self-image) to obtain image data according to control of the CPU 401. The portable terminal 400 may include an imaging unit, such as a CCD (Charge Coupled Device) sensor, in place of the CMOS sensor 405. The imaging device I/F 406 is a circuit that controls the drive of the CMOS sensor 405. The sensor 407 may be a variety of sensors such as an electromagnetic compass, a gyrocompass, or an acceleration sensor, for detecting a geomagnetic field. The medium I/F 409 controls reading or writing (storing) of data to the medium 408 like a flash memory. The GPS receiving unit 410 receives a GPS signal from a GPS satellite.

Also, the portable terminal 400 includes a telecommunication circuit 411, an antenna 411*a* of the telecommunication circuit 411, a CMOS sensor 412, an imaging device I/F 413, a microphone 414, a speaker 415, a sound input/output I/F 416, a display 417, an external device connection I/F 418, a short-range communication circuit 419, an antenna 419*a* of the short-range communication circuit 419, and a touch panel 420.

Of these, the telecommunication circuit 411 is provided for communicating with other devices via the communication network 10, for example. The CMOS sensor 412 is a type of built-in imaging unit that captures a subject according to control from the CPU 401 to obtain image data. The imaging device I/F 413 is a circuit that controls the drive of the CMOS sensor 412. The microphone 414 is a built-in circuit that converts a sound to an electrical signal. The speaker 415 is a built-in circuit that converts an electrical signal to a physical vibration to produce a sound such as music and a voice. The sound input/output I/F 416 is a circuit that processes the input and output of a sound signal between the microphone 414 and the speaker 415 according to control from the CPU 401.

The display 417 is a type of display unit such as a liquid crystal or an organic EL (Electro Luminescence) for displaying an image of a subject or a variety of icons. The external device connection I/F 418 is an interface for connecting various external devices. The short-range communication circuit 419 provides a variety of short-range wireless communications. The connection device 140 and the sensor device 130 described in FIG. 2 are connected to the portable terminal 400 via the external device connection I/F 418 or the short-range communication circuit 419. The touch panel 420 is a type of input unit that allows a user to operate the portable terminal 400 by pressing a screen of the display 417.

Also, the mobile terminal 400 includes a bus line 421. The bus line 421 includes an address bus, and a data bus, and allows various control signals to pass therethrough for electrically connecting the components illustrated in FIG. 4.

First Embodiment

<Function Configuration>

FIG. 5 is a diagram illustrating an example of a functional configuration of a communication system according to a first embodiment. In FIG. 5, a user terminal 120*b* has the same functional configuration as that of the user terminal 120*a*.

(Functional Configuration of Server Apparatus)

A server apparatus 100 implements a communication unit 501, an authentication unit 502, a communication management unit 503, an information management unit 504, and an information transmission unit 505 by causing a CPU 301 to execute a program stored in a memory. At least a part of each of the above-described functional configurations may be implemented by hardware. The server apparatus 100 implements a user information storage unit 506, a communication information storage unit 507, and the like by a program executed by the CPU 301, an HD 304, an HDD controller 305, and the like.

For example, the communication unit 501 connects the server apparatus 100 to a communication network 10 using a network I/F 308 illustrated in FIG. 3, and performs a communication process for communicating with other devices. The communication unit 501 serves as a reception unit that receives collateral information transmitted from the host terminal 110.

For example, the authentication unit 502 performs an authentication process for authenticating a user (or an information processing device) who uses an information processing device such as the host terminal 110 or the user terminal 120. For example, when a user ID preliminarily stored in the user information storage unit 506 and user's password (hereinafter, which is referred to as a password A) are included in a connection request transmitted from the host terminal 110 or the user terminal 120, the authentication unit 502 determines the user to be an allowable user.

FIG. 6A illustrates an image of an example of user information 601 stored in the user information storage unit 506. In the example of FIG. 6A, multiple pieces of information such as a "user ID", a "password A", a "user name", and "collateral information to be used" are stored in the user information 601.

The "user ID" is identification information that identifies the user who is authorized to use the communication system 1. The "password A" is a password corresponding to the user ID. The password A is an example of authentication information corresponding to the user ID. For example, the password A may be other authentication information such as a digital meeting or biometric information. The "user name" is information such as the name of the user corresponding to the user ID. The "collateral information to be used" is information indicating a type of collateral information that the user corresponding to the user ID hopes to distribute in a session, which is registered in advance.

The communication management unit 503 performs a communication management process to manage a connection to a session by an information processing device such as the host terminal 110 or the user terminal 120. For example, the communication management unit 503 issues a session ID and a password (hereinafter, referred to as a password B) for identifying the session in response to a request from an information processing device. When the connection request transmitted from the information processing device includes a user ID of an allowable user and the password A, and an issued session ID and the password B, the communication management unit 503 allows the information processing device to connect to the session. Moreover, the communication management unit 503 receives a request from the information processing device (the host terminal 110), and associates collateral information about an environment with a session. For example, the communication management unit 503 stores a session ID identifying a session and collateral information in the communication information 602 as illustrated in FIG. 6B.

FIG. 6B illustrates an image of an example of the communication information 602 stored in the communication information storage unit 507. In the example of FIG. 6B, multiple pieces of information such as a "session ID," a "password B," and "collateral information" are stored in the communication information 602. The "session ID" is identification information that identifies a session (for example, an online meeting and the like). The "password B" is a password corresponding to the session ID. The password B is an example of authentication information corresponding to the session ID, and may be authentication information other than the password.

The "collateral information" is collateral information that is associated with a session by the communication management unit 503 in response to a request from an information processing device. In the example of FIG. 6B, a sound, an image, and illumination are associated with the session with the session ID "SE001" as a type of collateral information.

The information transmission unit 505 performs an information transmission process for transmitting collateral information to multiple information processing devices participating in a session. The specific processing details of the information transmission process performed by the information transmission unit 505 will be described below.

The user information storage unit 506 stores user information 601, for example, as illustrated in FIG. 6A. The communication information storage unit 507 stores communication information 602, for example, as illustrated in FIG. 6B.

(Function Configuration of Host Terminal)

The host terminal 110 is implemented, for example, by causing a CPU (CPU 301 or CPU 401) to execute a program stored in a memory included in an information processing device such as the computer 300 illustrated in FIG. 3 or the portable terminal 400 illustrated in FIG. 4. For example, the host terminal 110 implements a communication unit 521, a communication controller 522, a display controller 523, an operation reception unit 524, a collateral information acquiring unit 525, and a collateral information transmission unit 526 by causing the CPU to execute an application that is stored in the memory included in the host terminal 110 and that corresponds to the communication system 1. At least a part of each of the above-described functional configurations may be implemented by hardware. The host terminal 110 implements a storage unit 527 by causing a CPU included in the host terminal 110 to execute a program and by a storage device included in the host terminal 110.

The communication unit 521 connects the host terminal 110 to the communication network 10 using, for example, the network I/F 308 in FIG. 3 or the telecommunications circuit 411 in FIG. 4, and performs a communication process for communicating with other devices.

The communication controller 522 performs various processes (communication control process) relating to a session such as an online meeting. For example, the communication controller 522 performs a process for requesting the server apparatus 100 to set a session, a process for requesting a connection to the session, a process for acquiring content data, a process for transmitting and receiving content data, and a process for outputting content data. Because the communication control process performed by the communication controller 522 may be the same as that of a conventional online meeting system, the detailed description thereof will not be repeated here.

The display controller 523 performs a display control process for displaying various display screens on a display unit such as the display 306 in FIG. 3 or the display 417 in FIG. 4. For example, the display controller 523 performs a process of causing the content data received by the communication controller 522 to be displayed on the display unit and a process of causing various operation screens to be displayed on the display unit.

The operation reception unit 524 receives various operations by a user who uses the host terminal 110. For example, the operation reception unit 524 receives an operation from a user via various operation screens displayed by the display controller 523.

For example, the collateral information acquiring unit 525 controls the sensor device 130 described in FIG. 2B and performs a collateral information acquiring process for acquiring a variety of types of collateral information. For example, the collateral information acquiring unit 525 acquires sound data representing the environment around the host terminal 110 (an example of collateral information) using one or more of the microphones 211 illustrated in FIG. 2B. The collateral information acquiring unit 525 acquires image data representing the environment around the host terminal 110 (an example of collateral information) using one or more of the cameras 212, for example, illustrated in FIG. 2B. Further, the collateral information acquiring unit 525 acquires sensor data (for example, illumination, temperature, humidity and the like) representing the environment around the host terminal 110 using the various sensors 213 illustrated in FIG. 2B. The collateral information acquiring unit 525 may acquire control data (setting data) of an illuminating device and the like from the illuminating device and the like connected to the host terminal 110.

The collateral information transmission unit 526 performs a collateral information transmission process for transmitting collateral information acquired by the collateral information acquiring unit 525. For example, the collateral information transmission unit 526 transmits the collateral information acquired by the collateral information acquiring unit 525 to the server apparatus 100. As another example, the collateral information transmission unit 526 may transmit the collateral information acquired by the collateral information acquiring unit 525 to the user terminal 120 connected to the same session.

For example, the storage unit 527 temporarily stores the collateral information acquired by the collateral information acquiring unit 525. The storage unit 527 stores a variety of pieces of information such as setting information of the host terminal 110.

(Function Configuration of User Terminal)

The user terminal 120 is implemented, for example, by causing a CPU (CPU 301 or CPU 401) to execute a program stored in a memory included in the computer 300 illustrated in FIG. 3 or an information processing device such as the portable terminal 400 illustrated in FIG. 4. For example, the user terminal 120 implements a communication unit 531, a communication controller 532, a display controller 533, an operation reception unit 534, a collateral information receiving unit 535, an information converting unit 536, and an environmental controller 537 by causing a CPU to execute an application corresponding to the communication system 1 and stored in the memory included in the user terminal 120. At least a part of each of the above-described functional configurations may be implemented by hardware. The user terminal 120 implements the storage unit 527 by a program executed by the CPU included in the user terminal 120 and by a storage device and the like included in the user terminal 120.

The communication unit 531 connects the user terminal 120 to the communication network 10 using, for example, the network I/F 308 in FIG. 3 or the telecommunications circuit 411 in FIG. 4 and performs a communication process for communicating with other devices.

The communication controller 532 performs various processes (communication control processes) relating to a session such as an online meeting. For example, the communication controller 532 performs a process for requesting the server apparatus 100 to set a session, a process for requesting a connection to a session, a process for acquiring content data, a process for transmitting and receiving content data, and a process for outputting content data.

The display controller 533 performs a display control process for displaying various display screens on a display unit such as the display 306 in FIG. 3 or the display 417 in FIG. 4. For example, the display controller 533 performs a process of causing content data received by the communication controller 532 to be displayed on a display unit and a process of causing various operation screens to be displayed on the display unit.

The operation reception unit 534 receives various operations by a user using the user terminal 120. For example, the operation reception unit 534 receives an operation from a user via various operation screens displayed by the display controller 533.

The collateral information receiving unit 535 performs a process of receiving collateral information to receive the collateral information transmitted from the server apparatus 100 or the host terminal 110 via the communication unit 531. For example, the collateral information receiving unit 535 stores the received collateral information in the storage unit 538 or the like.

The information converting unit 536 modifies the collateral information received by the collateral information receiving unit 535 as necessary so as to adapt the collateral information to the connection device 140 connected to the user terminal 120. For example, the information converting unit 536 preliminarily stores the information regarding the connection device 140 in the storage unit 538 and converts the collateral information received by the collateral information receiving unit 535 so as to adapt to a program for controlling the connection device 140 or a data format.

The environmental controller 537 performs an environmental control process for controlling the environment around the user terminal 120 based on the collateral information received by the collateral information receiving unit 535. For example, the environmental controller 537 reproduces (outputs) sound data included in the collateral information using one or more of the speakers 201 as illustrated in FIG. 2A. The environmental controller 537 displays an image on one or more of the display devices 202 as illustrated in FIG. 2A by using image data (still image data or moving image data) included in the collateral information. Further, the environmental controller 537 changes the brightness, color tone, or the like of one or more of the illuminating devices 203 as illustrated in FIG. 2A based on the sensor data, control data, or the like included in the collateral information.

For example, the storage unit 538 temporarily stores the collateral information received by the collateral information receiving unit 535. The storage unit 538 preliminarily stores information regarding the connection device 140 connected to the user terminal 120.

<Processing Flow>

Next, a flow of a process of a communication method according to a first embodiment will be described.

(Session Start Process)

Figure 7:
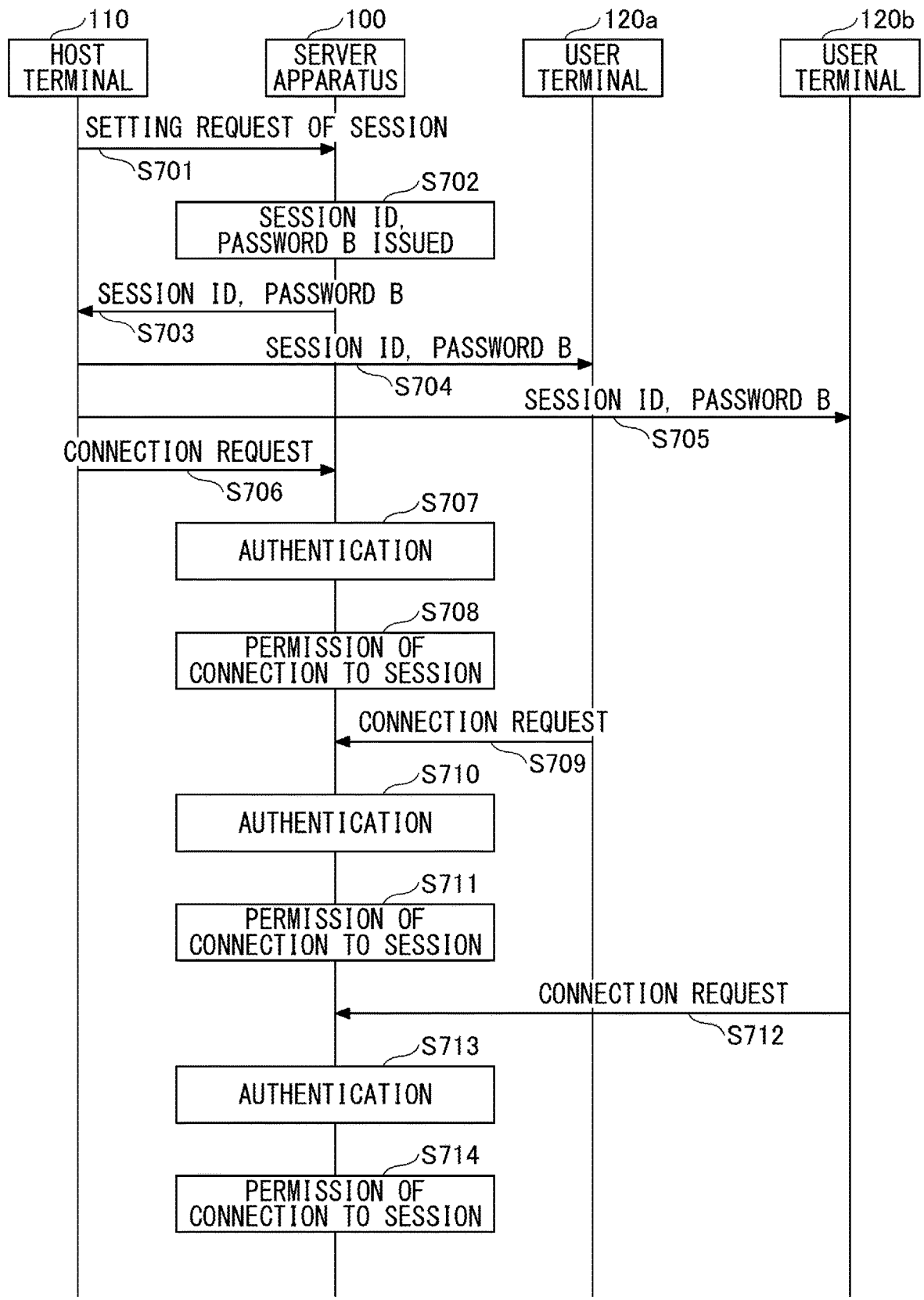
FIG. 7 is a sequence diagram illustrating an example of a start process of a session according to a first embodiment.

FIG. 7 is a sequence diagram illustrating an example of a start process of a session according to a first embodiment. This process illustrates an example of the start process of the session executed in the communication system 1 when starting the session, for example, an online meeting.

In step S701, the communication controller 522 of the host terminal 110 transmits a setting request of the session to the server apparatus 100 in response to a predetermined operation by a user of the host terminal 110.

In Step S702, when the communication management unit 503 of the server apparatus 100 receives the setting request of the session transmitted from the host terminal 110, the communication management unit 503 issues a session ID and a password B and stores the session ID and the password B in the communication information 602 as illustrated in FIG. 6B. In this case, the communication management unit 503 may authenticate the user (or the host terminal 110) who utilizes the host terminal 110 using the authentication unit 502, and issues the session ID and the password B when the authentication is successful.

In step S703, the communication management unit 503 of the server apparatus 100 notifies the host terminal 110 that is a requester, of the issued session ID and the password B.

In steps S704 and S705, the host terminal 110 transmits the session ID and the password B notified from the server apparatus 100 to the user terminals 120a and 120b of users participating in a session, for example, an online meeting. For example, the communication controller 522 of the host terminal 110 may transmit the session ID and the password B by email or the like to the user terminals 120a and 120b in response to a predetermined operation by the user of the host terminal 110.

As another example, the processes of step S704 and step S705 may be performed by the communication management unit 503 of the server apparatus 100. In this case, in step S701, the setting request of the session sent by the host terminal 110 includes email addresses of users using the user terminals 120a and 120b.

After each of the above-described processes is executed, at the start time of the online meeting, the host terminal 110 and the user terminals 120a and 120b execute the processes starting from step S706.

In step S706, the communication controller 522 of the host terminal 110 transmits a connection request requesting a connection to the session set in step S701 to the server apparatus 100. The connection request may include, for example, the user ID of the user using the host terminal 110, the password A, the session ID of the session, and the password B.

In step S707, the communication management unit 503 of the server apparatus 100 authenticates the user ID and the password A included in the connection request received from the host terminal 110 using the authentication unit 502. Here, when the authentication fails, for example, the communication management unit 503 notifies the host terminal 110 that is a requester, of the authentication result indicating that the authentication fails, and stops the process in step S708. Meanwhile, when the authentication is successful, the communication management unit 503 executes the process of step S708. When the host terminal 110 has already logged on to the server apparatus 100, the process in step S707 may be omitted.

In step S708, when the session ID and the password B included in the connection request are stored in the communication information 602 as illustrated in FIG. 6B, the communication management unit 503 of the server apparatus 100 allows the connection to the session of the host terminal 110.

In step S709, the communication controller 532 of the user terminal 120a transmits, to the server apparatus 100, a connection request requesting a connection to the session. The connection request includes, for example, the user ID and the password A of the user terminal 120a and the session ID and the password B received in step S704.

In step S710, the communication management unit 503 of the server apparatus 100 authenticates the user ID and the password A included in the connection request received from the user terminal 120a using the authentication unit 502. Here, when the authentication fails, for example, the communication management unit 503 notifies the user terminal 120a that is a requester, of the authentication result indicating that the authentication fails, and stops the process of step S711. Meanwhile, when the authentication is successful, the communication management unit 503 executes the process of step S711. When the user terminal 120a has already logged on to the server apparatus 100, the process in step S710 may be omitted.

In step S711, when the session ID and the password B included in the connection request are stored in the communication information 602 as illustrated in FIG. 6B, the communication management unit 503 of the server apparatus 100 allows the connection to the session of the user terminal 120a.

The processes of steps S709 to S711 may be performed prior to the processes of steps S706 to S708, or may be performed in parallel with the processes of steps S706 to S708.

In step S712, the communication controller 532 of the user terminal 120b transmits, to the server apparatus 100, a connection request requesting a connection to the session. The connection request includes, for example, the user ID and the password A of the user terminal 120b and the session ID and the password B received in step S705.

In step S713, the communication management unit 503 of the server apparatus 100 authenticates the user ID and the password A included in the connection request received from the user terminal 120b using the authentication unit 502. Here, when the authentication fails, for example, the communication management unit 503 notifies the user terminal 120b that is a requester, of the authentication result indicating that the authentication fails, and stops the process of step S714. Meanwhile, when the authentication is successful, the communication management unit 503 executes the process of step S711. When the user terminal 120b has already logged on to the server apparatus 100, the process in step S713 may be omitted.

In step S714, when the session ID and the password B included in the connection request are stored in the communication information 602 as illustrated in FIG. 6B, the communication management unit 503 of the server apparatus 100 permits the connection of the user terminal 120b to the session.

The processes of steps S713 to S714 may be performed prior to the processes of steps S706 to S708 or steps S709 to S711, or may be performed in parallel with the processes of steps S706 to S708 or the processes of steps S709 to S711.

According to the above process, the host terminal 110 and the user terminals 120a and 120b can participate in the same session (online meeting), and can transmit and receive, for example, audio, a video, shared data, and the like of the meeting.

(Transmission of Collateral Information)

FIG. 8 is a sequence diagram illustrating an example of a transmission process of collateral information according to the first embodiment. For example, the process is performed in parallel with a process of transmitting and receiving content data between the host terminal 110 and the user terminals 120a and 120b.

In step S801, the collateral information acquiring unit 525 of the host terminal 110 acquires collateral information concerning the environment around the host terminal 110 using the sensor device 130, for example, illustrated in FIG. 2B. The collateral information acquired by the collateral information acquiring unit 525 includes, for example, sound data representing the environment around the host terminal 110, image data representing the environment around the host terminal 110, and sensor data (or control data acquired from the illuminating device) acquired by various sensors 213.

Here, the audio data and the image data acquired by the collateral information acquiring unit 525 are different from audio data and video data of a meeting that are transmitted and received in a session of an online meeting and the like. For example, the audio data and the video data of the meeting to be transmitted and received at an online meeting are used for conversations at the online meeting, for example, an image capturing a user from the front or a sound picking up only the user's voice.

In contrast, the collateral information acquired by the collateral information acquiring unit 525 is data representing the environment around the host terminal 110. For example, image data included in the collateral information are taken by the camera 212 to take a scene outside the window, or the image data taken by the host terminal 110 to take a scene around the host terminal 110. The sound data included in the collateral information is obtained by acquiring the sound around the host terminal 110. For example, if a user using the host terminal 110 is communicating in an environment where music is playing, the music is acquired as sound data.

Preferably, the host terminal 110 continuously transmits the collateral information having a great change such as sound data, to the server apparatus 100, and intermittently transmits the collateral information having a small change such as illumination data or image data, to the server apparatus 100 at predetermined time intervals.

In step S802, the collateral information transmission unit 526 of the host terminal 110 transmits the collateral information acquired by the collateral information acquiring unit 525 to the server apparatus 100 through the communication unit 521.

In step S803, the information management unit 504 of the server apparatus 100 associates the collateral information received from the host terminal 110 with the session to which the host terminal 110 is connected.

In step S804, the information transmission unit 505 of the server apparatus 100 sets collateral information to be transmitted to the user terminals 120a and 120b. For example, when the "collateral information to be used" is registered in the user information 601 as illustrated in FIG. 6A, the information transmission unit 505 selects the collateral information registered in the "collateral information to be used" from the collateral information associated with the session. Therefore, it is possible to inhibit the transmission of unnecessary collateral information to the user terminals 120a and 120b.

Meanwhile, when the "collateral information to be used" is not registered in the user information 601, the information transmission unit 505 of the server apparatus 100 may, for example, set collateral information to be transmitted to the user terminal 120a by the processes in steps S805 to S807.

In step S805, the information transmission unit 505 of the server apparatus 100 transmits, to the user terminal 120a, a selection request for requesting the user terminal 120a to select collateral information to be received by the user terminal 120a, from among the collateral information associated with the session.

In step S806, the display controller 533 of the user terminal 120a displays a selection screen for selecting a type (sound, image, illumination and the like) of the collateral information associated with the session, and the operation reception unit 534 accepts the selection operation from the user.

In step S807, the operation reception unit 534 of the user terminal 120a transmits the type of collateral information selected by the user to the server apparatus 100. Accordingly, the information transmission unit 505 of the server apparatus 100 can set the collateral information to be transmitted to the user terminal 120a.

In step S808, the information transmission unit 505 of the server apparatus 100 transmits the set collateral information to the user terminal 120a.

In step S809, the environmental controller 537 of the user terminal 120a applies the collateral information received from the server apparatus 100. For example, the environmental controller 537 of the user terminal 120a performs an application process of the collateral information described below in FIG. 9.

Similarly, when "collateral information to be used" is not registered in the user information 601, the information transmission unit 505 of the server apparatus 100 may set collateral information to be transmitted to the user terminal 120b by the processes in steps S810 to S812.

In step S810, the information transmission unit 505 of the server apparatus 100 transmits, to the user terminal 120b, a selection request for requesting the user terminal 120b to select collateral information to be received by the user terminal 120b from among the collateral information associated with the session.

In step S811, the display controller 533 of the user terminal 120b displays a selection screen for selectively displaying a type of collateral information associated with the session, and the operation reception unit 534 accepts the selection operation by the user.

In step S812, the operation reception unit 534 of the user terminal 120b transmits the type of collateral information selected by the user to the server apparatus 100. Accordingly, the information transmission unit 505 of the server apparatus 100 can set the collateral information to be transmitted to the user terminal 120b.

In step S813, the information transmission unit 505 of the server apparatus 100 transmits the set collateral information to the user terminal 120b.

In step S814, the environmental controller 537 of the user terminal 120b applies the collateral information received from the server apparatus 100. For example, the environmental controller 537 of the user terminal 120b performs an application process of the collateral information described below in FIG. 9.

As a result of the above-described process, the communication system 1 can transmit collateral information representing the environment around the host terminal 110 to the user terminals 120a and 120b connected to the same session as the host terminal 110. The process of setting the collateral information illustrated in steps S804, S805 to S807, and S810 to 812 in FIG. 8 may be performed only once. Alternatively, for example, the process of setting the collateral information may be performed multiple times when the number of multiple pieces of collateral information is increased or decreased, or at predetermined time intervals.

(Application Processing of Collateral Information)

FIG. 9 is a sequence diagram illustrating an example of an application process of collateral information according to the first embodiment. For example, in step S809 or step S814 of FIG. 8, an example of an application process of associated information executed by the user terminal 120 is illustrated.

Here, an example in which the user terminal 120 receives sound data, image data, and illumination data as collateral information, will be described.

In step S901, when the user terminal 120 is connected to a session such as an online meeting, upon receiving the collateral information, processes starting from step S902 are performed as described below.

In step S902, the environmental controller 537 of the user terminal 120 selects a device corresponding to the received collateral information from the connection device 140 connected to the user terminal 120. Here, the environmental controller 537 selects the speaker 201 for reproducing sound data, the display device 202 for displaying an image based on image data, and the illuminating device 203 corresponding to illumination data.

In step S903, the information converting unit 536 of the user terminal 120 converts the received collateral information as necessary. For example, when the illumination data is illumination intensity data obtained by an illumination intensity sensor or the like, the environmental controller 537 converts the illumination data into control information (for example, control information for setting brightness, color, or the like) for controlling the illuminating device 203 based on the illumination intensity data. When the sound data is not in a format capable of being output from the speaker 201, the information converting unit 536 converts the sound data into a format capable of being output from the speaker 201. Similarly, when the image data is not in a format that can be displayed on the display device 202, the information converting unit 536 converts the image data into a format that can be displayed on the display device 202.

In step S904, the environmental controller 537 of the user terminal 120 transmits sound data to the speaker 201 in a format that can be reproduced by the speaker 201. Accordingly, in step S907, the speaker 201 reproduces the sound data.

In step S905, the environmental controller 537 of the user terminal 120 transmits image data to the display device 202 in a format that can be displayed by the display device 202. Thus, in step S908, the display device 202 displays an image based on the image data.

In step S906, the environmental controller 537 of the user terminal 120 transmits, to the illuminating device 203, control information for changing, for example, the brightness and color of the illuminating device 203 in a format that can be processed by the illuminating device 203. Accordingly, in step S909, the illuminating device 203 changes the brightness and hue of the illuminating device 203 in accordance with the control information.

(Application Image of Collateral Information)

Figure 10A:
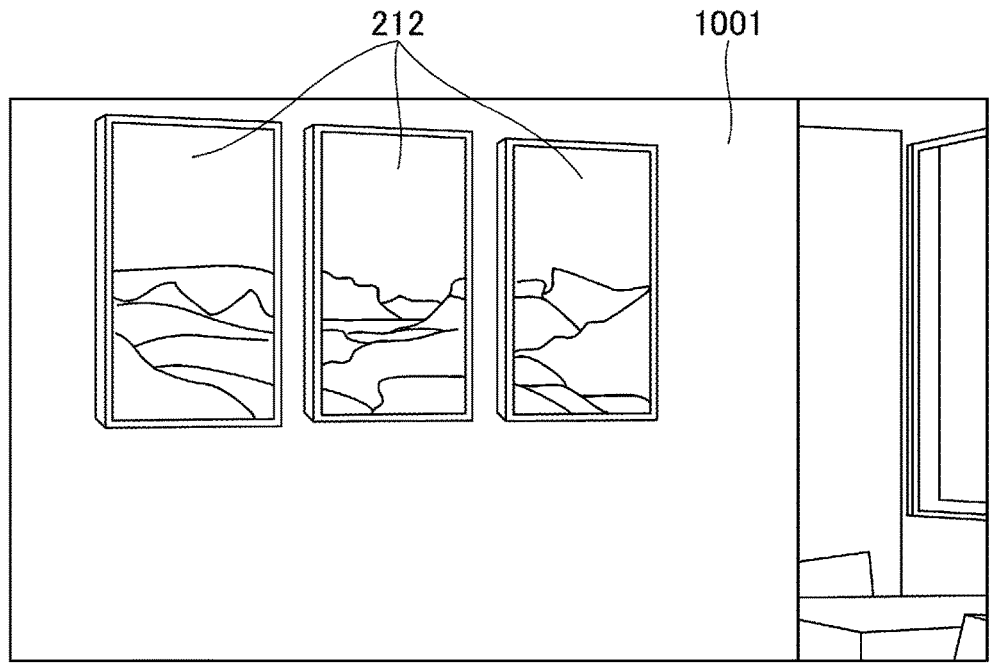
FIGS. 10A and 10B are diagrams illustrating an example of an application image of collateral information according to a first embodiment.

FIG. 10A illustrates an example of an application image of collateral information by the display device 202. In an example of FIG. 10A, multiple window-type display devices 202 are provided in a wall 1001 of the room in which the user terminal 120 is installed, and a view outside the window captured by the camera 212 of the host terminal 110 is displayed on the window-type display devices 202. Accordingly, the user using the user terminal 120 may, for example, hold an online meeting while viewing a view similar to that of the user using the host terminal 110.

Figure 10B:
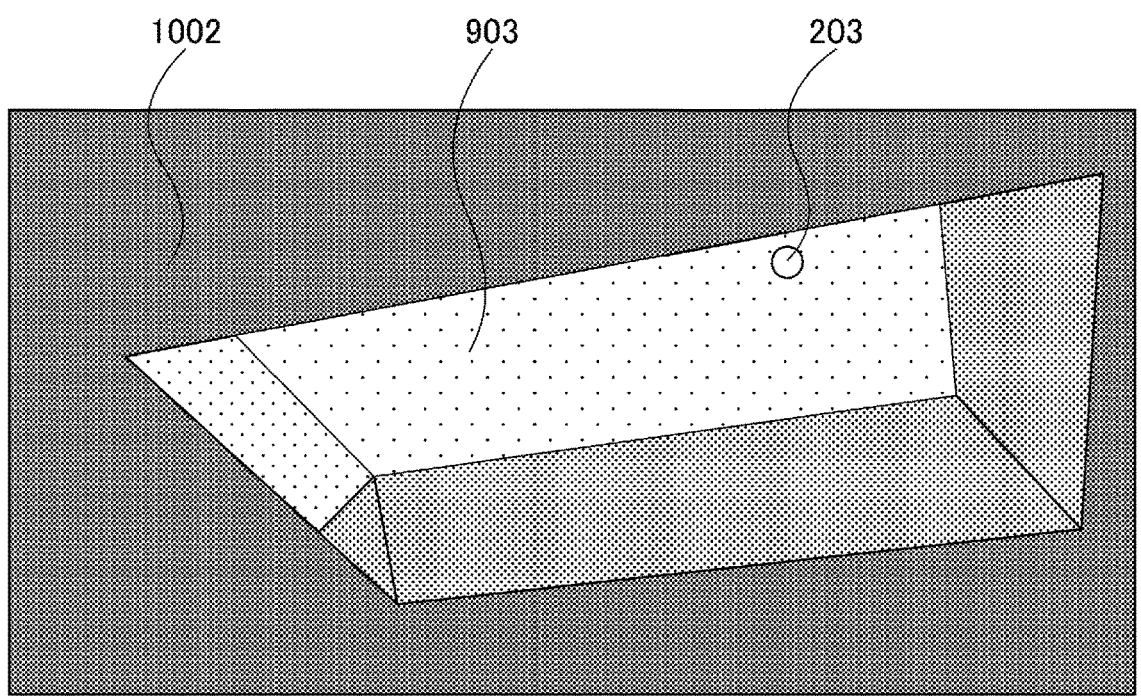

FIG. 10B illustrates an example of an application image of collateral information by the illuminating device 203. In an example of FIG. 10B, a ceiling 1002 of the room in which the user terminal 120 is installed includes a skylight-type illuminating device 203, and the brightness or the hue of the illuminating device 203 can be set by control from the environmental controller 537. Thus, the illuminating device 203 can reproduce images, such as sunny days, evening, rainy days, moonlight, and the like, by illumination. Accordingly, the user using the user terminal 120 may, for example, hold an online meeting while feeling the same light as the user using the host terminal 110.

As described above, according to the first embodiment, in a session in which content data are transmitted and received between the host terminal 110 and one or more of the user terminals 120, the environment around the host terminal 110 can be shared with the user terminal 120.

Second Embodiment

In the first embodiment, an example in which the host terminal 110 is connected to the sensor device 130, has been described. However, the host terminal 110 may not be necessarily connected to the sensor device 130.

<Function Configuration>

Figure 11:
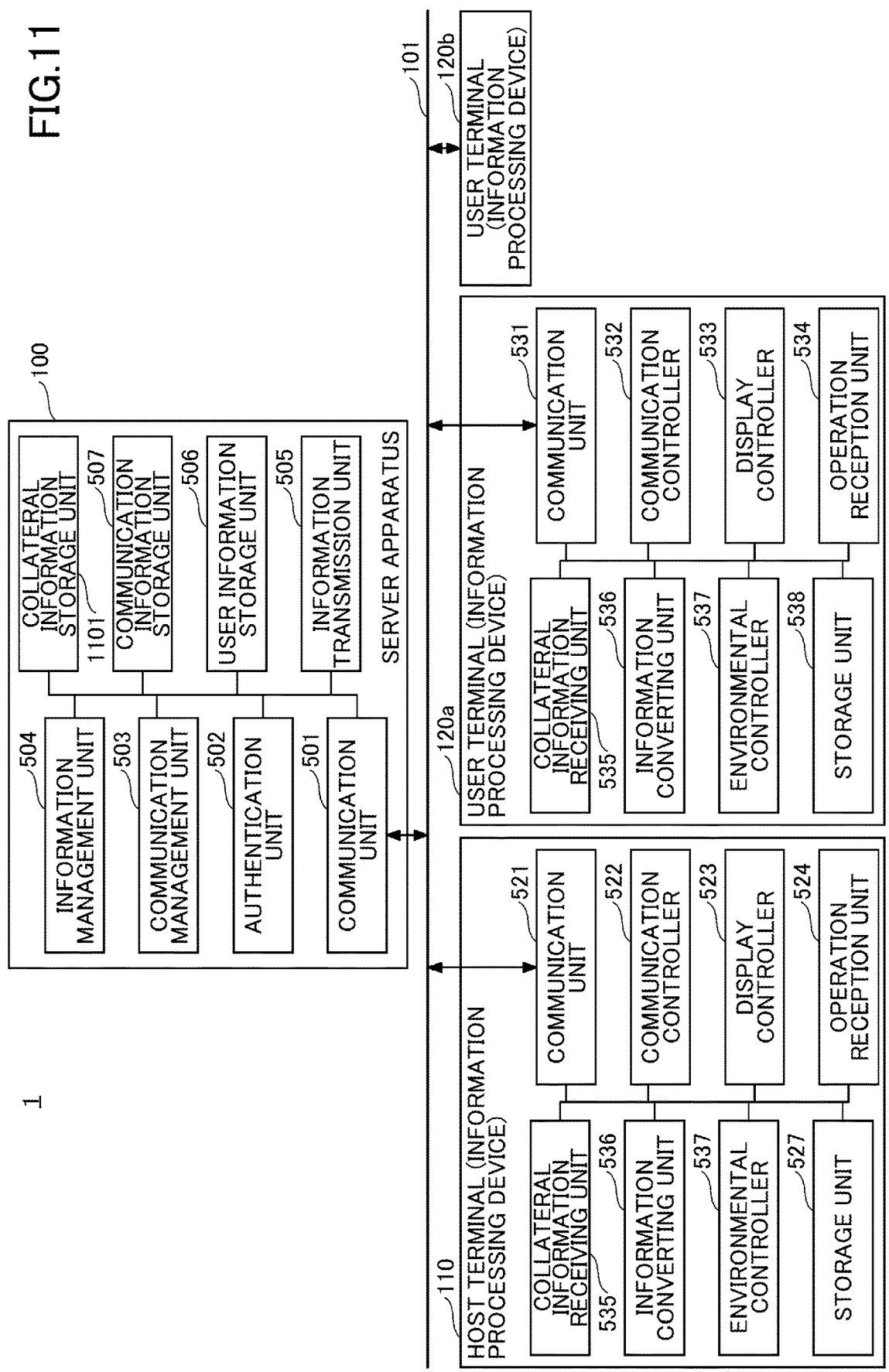
FIG. 11 is a diagram illustrating an example of a functional configuration of a communication system according to a second embodiment.

FIG. 11 is a diagram illustrating an example of a functional configuration of a communication system according to a second embodiment.

(Functional Configuration of Server Apparatus)

As illustrated in FIG. 11, the server apparatus 100 according to the second embodiment includes a collateral information storage unit 1101 in addition to the components of the functional configuration of the server apparatus 100 according to the first embodiment described in FIG. 5.

The collateral information storage unit 1101 is implemented by a program executed by the CPU included in the server apparatus 100 and a storage device included in the server apparatus 100, and stores multiple pieces of collateral information preliminarily registered.

(Function Configuration of Host Terminal)

As illustrated in FIG. 11, the host terminal 110 according to the second embodiment includes a collateral information receiving unit 535, an information converting unit 536, and an environmental controller 537 in place of the collateral information acquiring unit 525 and the collateral information transmission unit 526 of the host terminal 110 according to the first embodiment described in FIG. 5. Thus, the host terminal 110 can control an environment around the host terminal 110 based on the collateral information received from the server apparatus 100, similar to the user terminal 120.

<Processing Flow>

FIG. 12 is a sequence diagram illustrating an example of a transmission process of collateral information according to the second embodiment.

In step S1201, the display controller 523 of the host terminal 110 transmits a request for acquiring a collateral information list to the server apparatus 100 in response to a predetermined operation by a user.

In step S1202, when the request for acquiring the collateral information list is received from the host terminal 110, the information transmission unit 505 of the server apparatus 100 transmits the collateral information list that is a list of the collateral information stored in the collateral information storage unit 1101, to the host terminal 110 that is a requester.

FIG. 13A illustrates an image of an example of the collateral information list 1301 that is a list of collateral information stored in the collateral information storage unit 1101. In an example of FIG. 13A, a list of multiple sound data, illumination data, and image data is stored in the collateral information list. The sound data, the illumination data, and the image data are examples of multiple pieces of collateral information.

Preferably, each data is associated with tag information 1302 and 1303 as illustrated in FIGS. 13B and 13C. For example, "rain" of sound data is associated with the tag information 1302 as illustrated in FIG. 13B. For example, "Tokyo Tower" of image data is associated with tag information 1303 as illustrated in FIG. 13C.

Tag information contains multiple types of tags. A "seasonal tag" included in the tag information includes seasonal information such as spring, summer, autumn, winter, and the like. A "weather tag" includes weather information such as sunny weather, rainy weather, and cloudy weather. A "use tag" includes information about the use of a session such as a meeting, a lecture, or a clinical examination. For example, position information about latitude, longitude and the like is set in a "position information tag."

More than one pieces of information may be set in a tag. For example, a seasonal tag may have two tags: spring and summer.

A type of tag for which information is not set means that the tag does not have a particular condition. For example, a seasonal tag is not set to the tag information 1303, which means that the image data is appropriate for any season.

FIG. 14 is a diagram illustrating another example of a collateral information list according to the second embodiment. A collateral information list 1400 may be a template in which a combination of sound data, illumination data, and image data is predetermined for each title, for example, as illustrated in FIG. 14.

Referring to FIG. 12, the description of the sequence diagram will be continued.

In step S1203, the display controller 523 of the host terminal 110 displays a selection screen of collateral information on a display unit. As an example, the display controller 523 of the host terminal 110 displays a screen 1510 for selecting collateral information as illustrated in FIG. 15A based on the collateral information list 1301 illustrated in FIG. 13A. In an example of FIG. 15A, a selection screen 1510 for the collateral information is displayed with a selection field 1511 for sound data, a selection field 1512 for illumination data, and a selection field 1513 for image data.

Preferably, as illustrated in FIG. 15A, when "rain" is selected from the sound selection field 1511, the display controller 523 displays a display element 1514 indicating that the "rain" is selected and acquires a weather tag "rain" from the tag information 1302 as illustrated in FIG. 13B. The display controller 523 displays illumination data and image data having the weather tag "rain" preferentially (or selectively) in the selection field 1512 of the illumination and the selection field 1513 of the image. This prevents inconsistencies, for example, like an image of a sunny day being displayed despite the sound of rain.

The display controller 523 of the host terminal 110 may display a selection screen 1520 of collateral information illustrated in FIG. 15B based on the collateral information list 1400 illustrated in FIG. 14. In the example of FIG. 15B, a selection field 1521 of the data set is displayed in the selection screen 1520 of the collateral information. For example, as illustrated in FIG. 15B, when "evening Hawaii" is selected from the selection field 1521 of the data set, the display controller 523 displays a display element 1523 indicating that the "evening Hawaii" is selected. The display controller 523 selects sound data "wave," illumination data "dusk," and image data "Hawaiian beach" corresponding to the "evening Hawaii" from the collateral information list 1400 illustrated in FIG. 14. This makes it easier for users to choose the combination of collateral information they want to share.

The selection screen 1510 of the collateral information illustrated in FIG. 15A and the selection screen 1520 of the collateral information illustrated in FIG. 15B may be selected by a user by means of a "separate selection" tab 1515 illustrated in FIG. 15A and a "set selection" tag 1521 illustrated in FIG. 15B.

Referring to FIG. 12, the description of the sequence diagram will be continued.

In step S1204, the operation reception unit 524 of the host terminal 110 receives the selection of the collateral information by a user via the selection screen of the collateral information, for example, illustrated in FIG. 15A or FIG. 15B. In step S1205, the operation reception unit 524 transmits the selection result (information representing the selected collateral information) selected by the user to the server apparatus 100.

In step S1206, the information management unit 504 of the server apparatus 100 associates the selected collateral information with a session to which the host terminal 110 is connected based on the selection result received from the host terminal 110.

In step S1207, the information transmission unit 505 of the server apparatus 100 sets the collateral information to be transmitted to the user terminals 120a and 120b in the same manner as the first embodiment.

In step S1208, the information transmission unit 505 of the server apparatus 100 performs a transmission process of the collateral information to the user terminals 120a and 120b. For example, the information transmission unit 505 performs processes of steps S808, S809, S813, and S814 of FIG. 8.

In step S1209, the information transmission unit 505 of the server apparatus 100 sets the collateral information to be transmitted to the host terminal 110. For example, when "collateral information to be used" is registered in the user information 601 as illustrated in FIG. 6A, the information transmission unit 505 selects the collateral information registered in the "collateral information to be used" from the collateral information associated with the session. Meanwhile, when "the collateral information to be used" is not registered in the user information 601, the information transmission unit 505 of the server apparatus 100 may transmit a selection request for collateral information to the host terminal 110, and may receive the selection of the collateral information by the user, similar to the user terminal 120.

In step S1210, the information transmission unit 505 of the server apparatus 100 transmits the set collateral information to the host terminal 110.

In step S1211, the environmental controller 537 of the host terminal 110 applies the collateral information received from the server apparatus 100. For example, the environmental controller 537 of the host terminal 110 performs an application process of the collateral information described above in FIG. 9.

As a result of the above-described process, the host terminal 110 can share the same surrounding environment as that of one or more of the user terminals 120, even if the host terminal 110 does not include the sensor device 130.

Third Embodiment

In a third embodiment, an example in which the server apparatus 100 associates collateral information with a session based on the present position data of the host terminal 110, will be described. The functional configuration of the communication system 1 according to the third embodiment may be the same as the functional configuration of the communication system 1 according to the second embodiment described in FIG. 11.

<Processing Flow>

Figure 16:
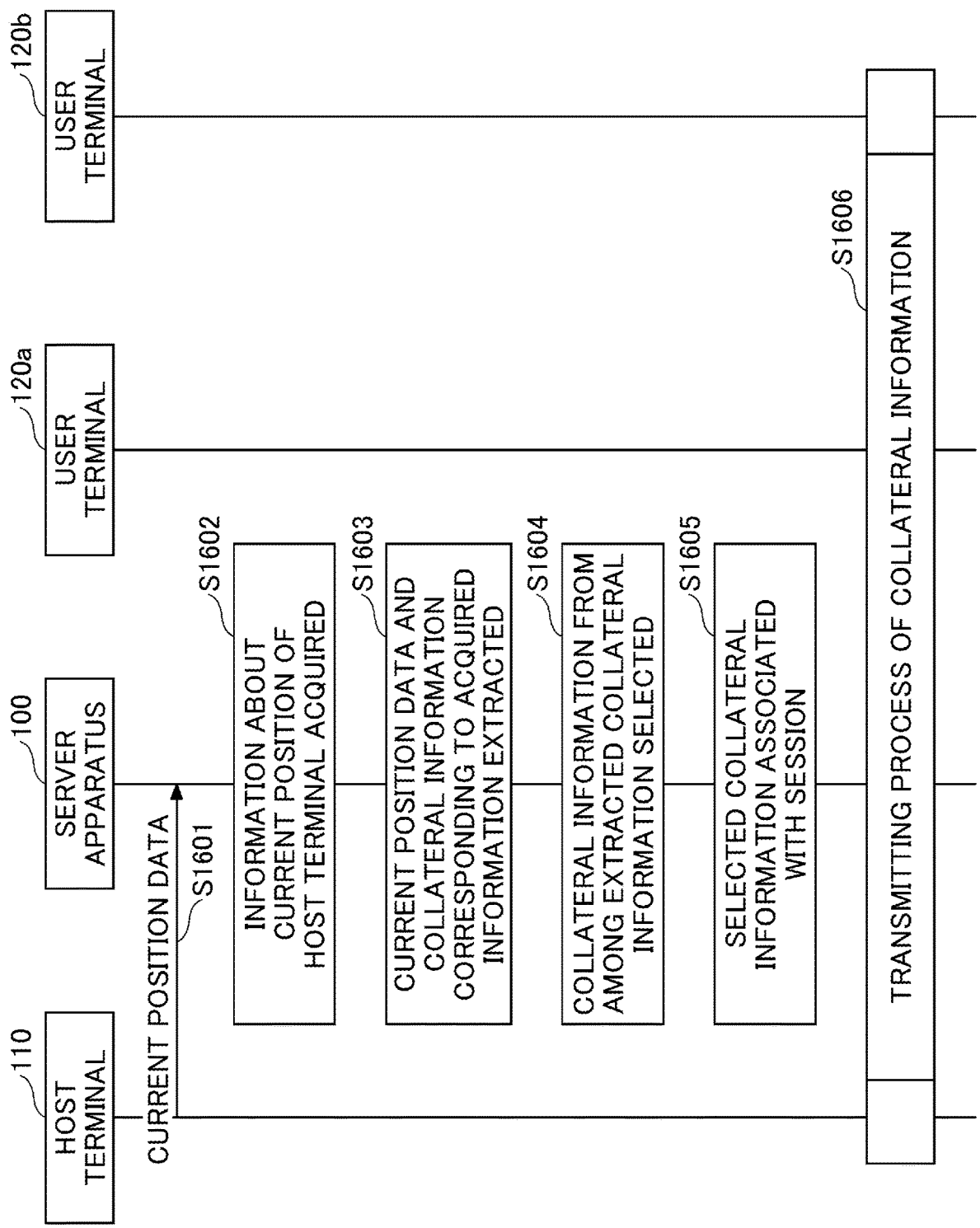
FIG. 16 is a sequence diagram illustrating an example of a transmission process of collateral information according to a third embodiment.

FIG. 16 is a sequence diagram illustrating an example of a transmission process of collateral information according to the third embodiment.

In step S1601, the operation reception unit 524 of the host terminal 110 transmits the present position data (for example, the latitude and longitude) representing the present position of the host terminal 110 to the server apparatus 100 in response to a predetermined operation by a user.

When the host terminal 110 is a portable terminal 400 as illustrated in FIG. 4, the operation reception unit 524 can acquire the present position data of the host terminal 110 from the GPS reception unit 410, the OS, or the like in FIG. 4.

In step S1602, the information management unit 504 of the server apparatus 100 acquires information concerning the present position of the host terminal 110 from, for example, the information server 102 or an external web service. Here, for example, as an illustrative example, the information management unit 504 acquires the weather of the present place of the host terminal 110 and assumes that the weather of the present place is "sunny."

In step S1603, the information management unit 504 of the server apparatus 100 extracts the present position data and the collateral information corresponding to the acquired information (for example, the weather "sunny") from among multiple pieces of collateral information stored in the collateral information storage unit 1101. For example, referring to the tag information associated with the multiple pieces of collateral information, the information management unit 504 extracts the tag information 1701 and 1702 in which the weather tag is "sunny," and the tag information 1702 in which the latitude and longitude of the position information tag are similar to the present position data, as illustrated in FIG. 17.

In step S1604, the information management unit 504 of the server apparatus 100 selects the collateral information associated with the session from the extracted collateral information. For example, when multiple pieces of tag information having a latitude and a longitude of the position information tag close to the current position data are extracted, the information management unit 504 may select as the present position data the collateral information corresponding to the tag information having the closest latitude and longitude to the present position data. For example, when multiple pieces of tag information in which the weather tag is "sunny" is extracted, the information management unit 504 may randomly select the collateral information from among multiple pieces of collateral information.

Accordingly, as illustrated in FIG. 17, the information management unit 504 of the server apparatus 100 can select collateral information such as sound data, illumination data, and image data corresponding to the present data of the host terminal 110.

In step S1605, the information management unit 504 of the server apparatus 100 associates the selected collateral information with the session.

In step S1606, the communication system 1 transmits the collateral information to the host terminal 110 and one or more of the user terminals 120, for example, by performing processes similar to steps S1207 to S1211 in FIG. 12.

With the above-described process, the server apparatus 100 may share the environment corresponding to the present position of the host terminal 110 among the host terminal 110 and one or more of the user terminals 120.

As an application example, in step S1604, the information management unit 504 of the server apparatus 100 may display the selection screen 1530 of the collateral information, for example, illustrated in FIG. 15C, on the host terminal 110 and may allow a user to determine the collateral information associated with the session through the user's selection operation. In an example of FIG. 15C, the selection screen 1530 of the collateral information displays a selection field 1531 of the data set and state information 1532 representing the current state (for example, the current region, the date and time, the weather, or the like) of the host terminal 110. In addition, each data set relates to regions such as Shinjuku-ku, Tokyo and Fushimi-ku, Kyoto. This allows the user to select a more appropriate data set depending on the current region, date and time, weather, and the like of the host terminal 110.

The selection screen 1530 of the collateral information illustrated in FIG. 15C may be able to be selected by the user by, for example, a "region set selection" tab 1533 or the like from the display screen of the collateral information displayed in the second embodiment.

Fourth Embodiment

In the first to third embodiments, an example where the environment is shared between the host terminal 110 and one or more of the user terminals 120 using the server apparatus 100 has been described. However, the present invention is not limited thereto, and the host terminal 110 and one or more of the user terminals 120 may share the surrounding environment without using the server apparatus 100.

(Transmission Process 1 of Collateral Information)

FIG. 18 is a sequence diagram illustrating an example of a transmission process of collateral information according to a fourth embodiment. At the start of the process illustrated in FIG. 18, it is assumed that the host terminal 110 and the user terminals 120a and 120b are connected to a session such as the same online meeting. The host terminal 110 and the user terminal 120 have the same functional configuration as that of the first embodiment illustrated in FIG. 5.

In step S1801, the collateral information acquiring unit 525 of the host terminal 110 acquires collateral information concerning the environment around the host terminal 110 using the sensor device 130, for example, illustrated in FIG. 2B.

In steps S1802a and 1802b, the collateral information transmission unit 526 of the host terminal 110 transmits the acquired collateral information to the user terminals 120a and 120b connected to the same session. Accordingly, the collateral information receiving unit 535 of the user terminals 120a and 120b receives the collateral information transmitted from the host terminal 110.

In steps S1803a and 1803b, the environmental controller 537 of the user terminals 120a and 120b applies the applicable collateral information among the collateral information received from the host terminal 110. For example, the environmental controller 537 of the user terminals 120a and 120b performs the application process described in FIG. 9 using the applicable collateral information.

Through the above-described process, the host terminal 110 can share the environment around the host terminal 110 with the user terminals 120a and 120b.

(Transmission Process 2 of Collateral Information)

FIG. 19 is a sequence diagram illustrating another example of a transmission process of collateral information according to a fourth embodiment. At the start of the process illustrated in FIG. 19, it is assumed that the host terminal 110 and the user terminals 120a and 120b are connected to a session such as the same online meeting. The host terminal 110 and the user terminal 120 have the same functional configuration as that of the second embodiment illustrated in FIG. 11.

In step S1901, the display controller 523 of the host terminal 110 acquires from the storage unit 527 a collateral information list that is a list of the collateral information preliminarily stored in the storage unit 527 in response to a predetermined operation by a user. The display controller 523 may acquire the collateral information list from, for example, an external storage server or a cloud service in which multiple pieces of collateral information are preliminarily stored.

In step S1902, the display controller 523 of the host terminal 110 displays a screen for selecting collateral information, for example, illustrated in FIGS. 15A and 15B, using the acquired collateral information list. In step S1903, the operation reception unit 524 of the host terminal 110 receives a selection operation of the collateral information on the selection screen of the collateral information.

In step S1904, the operation reception unit 524 of the host terminal 110 acquires the selected collateral information from the storage unit 527 of the host terminal 110, for example. Alternatively, the operation reception unit 524 of the host terminal 110 may acquire the selected collateral information from, for example, an external storage server or a cloud service.

In steps S1905a and 1905b, the operation reception unit 524 of the host terminal 110 transmits the selected collateral information to the user terminals 120a and 120b using the communication unit 521.

In step S1906a, the environmental controller 537 of the host terminal 110 applies, among the selected collateral information, the collateral information applicable to the host terminal 110. For example, the environmental controller 537 of the host terminal 110 performs the application process described in FIG. 9 using the applicable collateral information.

In steps S1906b and 1906c, the environmental controller 537 of the user terminals 120a and 120b applies the applicable collateral information among the collateral information received from the host terminal 110. For example, the environmental controller 537 of the user terminals 120a and 120b performs the application process described in FIG. 9 using the applicable collateral information.

As a result of the above-described process, the host terminal 110 can share the surrounding environment between the host terminal 110 and the user terminals 120a and 120b even when the host terminal 110 does not have a sensor device 130.

As described above, according to each embodiment of the present invention, in a session in which content data is transmitted and received between multiple information processing devices (the host terminal 110 and the one or more user terminals 120), the environment around the information processing devices can be shared with other information processing devices.

It should be noted that the above embodiments are exemplary, and embodiments of the present invention can be modified and applied in a variety of ways. For example, collateral information may include a variety of data representative of the surrounding environment, including but not limited to sound, image, and illumination data, such as temperature, humidity, wind, or fragrance data.

Collateral information is not limited to actual data such as sound data, image data, and illumination data, and may be a file name of each data or link information to be acquired.

As discussed above, according to an embodiment of the present invention, in a session in which content data is transmitted and received between a plurality of information processing devices, an environment can be shared between multiple information processing devices.

<Supplement>

The functions of each of the embodiments described above may be implemented by one or more processing circuits. As used herein, a "processing circuit" includes a processor programmed to perform each function by software, such as a processor implemented in electronic circuits, an ASIC (Application Specific Integrated Circuit) designed to perform each function as described above, a digital signal processor (DSP), a field programmable gate array (FPGA), or a conventional circuit module.

The devices described in the examples also show only one of multiple computing environments for carrying out the embodiments disclosed herein. In some embodiments, the server apparatus 100 includes multiple computing devices, such as a server cluster. The multiple computing devices are configured to communicate with each other via any type of communication link, including networks, shared memory, and the like, and perform the processes disclosed herein. Each functional configuration of the server apparatus 100 may be grouped into a single server apparatus or divided into multiple devices.

What is claimed is:

1. A server apparatus comprising:
a transceiver that:
communicates with a host terminal and user terminals that transmit and receive content data to each other via a session, wherein the content data comprises voice data, video data, and image data of an online meeting; and
receives, from the host terminal, collateral information about an environment around the host terminal, wherein the collateral information is different from the content data and comprises sound data, illumination data, and image data related to a scene around the host terminal;
a memory that stores the collateral information; and
a processor coupled to the memory and that manages the session connected by each of the host terminal and the user terminals, wherein
each of the user terminals is connected to a connection device that operates based on the collateral information,
the memory stores information of a data format used by the connection device,
the processor converts a data format of the collateral information received from the host terminal into the data format used by the connection device,
the transceiver receives a request from at least one of the user terminals,
upon receiving the request, the processor associates the collateral information with the session,
the transceiver transmits a selection request that causes the at least one of the user terminals to display a selection screen used for selecting a type of the collateral information associated with the session, and
upon receiving the type of the collateral information selected by the at least one of the user terminals, the transceiver transmits the collateral information that causes the connection device connected to the at least one of the user terminals to operate based on the collateral information corresponding to the selected type so that an environment around the at least one of the user terminals matches the environment around the host terminal.

2. The server apparatus as claimed in claim 1,
wherein the processor authenticates a user using the at least one of the user terminals,
wherein the memory stores information of the user and a type of the collateral information associated with the information of the user,
wherein the transceiver transmits, to the at least one of the user terminals, a type of collateral information associated with the information of the user using the at least one of the user terminals among the collateral information associated with the session based on an authentication result of the processor.

3. The server apparatus as claimed in claim 1,
wherein the collateral information is information about an environment around the at least one of the user terminals,
wherein the transceiver receives the collateral information transmitted from the at least one of the user terminals, and
wherein the processor associates the collateral information transmitted from the at least one of the user terminals with the session.

4. The server apparatus as claimed in claim 1,
wherein the memory stores the collateral information, and
wherein the processor associates the collateral information stored in the memory with the session based on an instruction from the at least one of the user terminals.

5. The server apparatus as claimed in claim 4,
wherein the collateral information is associated with a tag,
wherein the collateral information includes multiple pieces of collateral information having different types of data, and
wherein the processor extracts, in response to completion of selection of one of the multiple pieces of collateral information, information about another collateral information of a different type of data related to the selected collateral information based on the tag.

6. The server apparatus as claimed in claim 5,
wherein the tag includes position information, and
wherein the processor is configured to associate the collateral information with the session based on the position information of the at least one of the user terminals and the tag.

7. The server apparatus as claimed in claim 4,
wherein the memory stores the multiple pieces of collateral information having different types of data in association with each other, and
wherein the processor associates the associated multiple pieces of collateral information with the session.

8. The server apparatus as claimed in claim 1,
wherein the collateral information comprises at least one of:
sound data for producing a sound representing the environment, the sound data being to be output from the at least one of the user terminals or a device connected to the at least one of the user terminals, or information specifying the sound data, image data for displaying an image representing the environment, the image data being to be output from the at least one of the user terminals or a display device connected to the at least one of the user terminals, or information specifying the image data, and control data for controlling brightness of an illuminating device connected to the at least one of the user terminals.

9. A communication system comprising:

a host terminal;

user terminals that transmit and receive content data to each other via a session, wherein the content data comprises voice data, video data, and image data of an online meeting; and a server apparatus that:
communicates with the host terminal and the user terminals;
receives, from the host terminal, collateral information about an environment around the host terminal, wherein the collateral information is different from the content data and comprises sound data, illumination data, and image data related to a scene around the host terminal;
stores the collateral information; and
manages the session connected by each of the host terminal and the user terminals, wherein each of the user terminals is connected to a connection device that operates based on the collateral information, the server apparatus stores information of a data format used by the connection device, the server apparatus converts a data format of the collateral information received from the host terminal into the data format used by the connection device, the server apparatus receives a request from at least one of the user terminals, upon receiving the request, the server apparatus associates the collateral information with the session, the server apparatus transmits a selection request that causes the at least one of the user terminals to display a selection screen used for selecting a type of the collateral information associated with the session, and upon receiving the type of the collateral information selected by the at least one of the user terminals, the server apparatus transmits the collateral information that causes the connection device connected to the at least one of the user terminals to operate based on the collateral information corresponding to the selected type so that an environment around the at least one of the user terminals matches the environment around the host terminal.

10. A communication method performed by a server apparatus, the communication method comprising:

communicating with a host terminal and user terminals that transmit and receive content data to each other via a session, wherein the content data comprises voice data, video data, and image data of an online meeting;

receiving, from the host terminal, collateral information about an environment around the host terminal, wherein the collateral information is different from the content data and comprises sound data, illumination data, and image data related to a scene around the host terminal;

storing the collateral information;

managing the session connected by each of the host terminal and the user terminals;

storing information of a data format used by a connection device, wherein each of the user terminals is connected to the connection device that operates based on the collateral information;

converting a data format of the collateral information received from the host terminal into the data format used by the connection device;

receiving a request from at least one of the user terminals;

upon receiving the request, associating the collateral information with the session;

transmitting a selection request that causes the at least one of the user terminals to display a selection screen used for selecting a type of the collateral information associated with the session; and upon receiving the type of the collateral information selected by the at least one of the user terminals, transmitting the collateral information that causes the connection device connected to the at least one of the user terminals to operate based on the collateral information corresponding to the selected type so that an environment around the at least one of the user terminals matches the environment around the host terminal.

* * * * *